(12) United States Patent
Lee et al.

(10) Patent No.: US 12,095,514 B2
(45) Date of Patent: Sep. 17, 2024

(54) ELECTRONIC APPARATUS INCLUDING ANTENNA AND AUDIO INTERFACE

(71) Applicant: Samsung Electronics Co., Ltd., Suwon-si (KR)

(72) Inventors: Bonam Lee, Suwon-si (KR); Hosan Baek, Suwon-si (KR); Seongkyoo Byeon, Suwon-si (KR); Junyoung Yang, Suwon-si (KR); Cheungwon Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 232 days.

(21) Appl. No.: 17/584,934

(22) Filed: Jan. 26, 2022

(65) Prior Publication Data
US 2022/0247500 A1 Aug. 4, 2022

Related U.S. Application Data

(63) Continuation of application No. PCT/KR2022/000597, filed on Jan. 13, 2022.

(30) Foreign Application Priority Data

Jan. 29, 2021 (KR) .................. 10-2021-0013428

(51) Int. Cl.
*H04B 15/02* (2006.01)
*G06F 3/16* (2006.01)
(Continued)

(52) U.S. Cl.
CPC .............. *H04B 15/02* (2013.01); *G06F 3/16* (2013.01); *H01Q 5/25* (2015.01); *H04L 12/66* (2013.01); *H04R 3/00* (2013.01)

(58) Field of Classification Search
CPC ..... H04L 65/752; H04L 65/80; H04L 65/612; H04L 65/613; H04L 65/762; H04L 65/61;
(Continued)

(56) References Cited

U.S. PATENT DOCUMENTS 9,407,378 B2 8/2016 Sim
9,544,405 B1 1/2017 Kodama et al.
(Continued)

FOREIGN PATENT DOCUMENTS

KR 10-2001-0062802 A 7/2001
KR 10-2004-0097171 A 11/2004
(Continued)

OTHER PUBLICATIONS

International Search Report dated May 9, 2022, issued in International Application No. PCT/KR2022/000597.

*Primary Examiner* — Lun-See Lao
(74) *Attorney, Agent, or Firm* — Jefferson IP Law, LLP

(57) ABSTRACT

An electronic apparatus is provided. The electronic apparatus includes a housing having a first surface, an antenna formed on the first surface, an interface that is connectable to an external terminal of an external apparatus via an audio connector formed on the first surface and configured to provide a detection signal indicating whether a connection with the external terminal is made, a processor configured to process an audio signal received from the external terminal of the external apparatus via the interface, a signal line extending from the interface, a noise filter connected to the processor, a matching element, and a switch configured to electrically connect one of the noise filter or the matching element to the signal line, based on the detection signal.

11 Claims, 15 Drawing Sheets

(51) Int. Cl.
*H01Q 5/25* (2015.01)
*H04L 12/66* (2006.01)
*H04R 3/00* (2006.01)

(58) Field of Classification Search
CPC ......... H04L 65/70; H04L 65/75; H04L 67/01;
H04L 43/028; H04L 43/087; H04L
43/0894; H04L 65/765; H04L 12/66;
H04R 3/00; H04B 1/16; H04B 17/23;
H04B 7/02; H04B 7/0408; H04B 7/0802;
H04B 7/0814; H04B 7/10; H04B 15/02;
G10H 1/0033; G10H 2240/175
USPC ........................ 381/122, 123, 56–58; 700/94
See application file for complete search history.

(56) References Cited

U.S. PATENT DOCUMENTS

| | | | | |
|---|---|---|---|---|
| 2005/0208901 A1* | 9/2005 | Chiu | ........................ | H04B 1/18 |
| | | | | 455/73 |
| 2009/0136058 A1* | 5/2009 | Choi | ........................ | H04R 5/04 |
| | | | | 381/74 |
| 2010/0303255 A1* | 12/2010 | Im | ........................ | H04M 1/6008 |
| | | | | 381/94.1 |
| 2012/0063445 A1* | 3/2012 | Sim | ........................ | H04B 15/02 |
| | | | | 370/347 |
| 2012/0188462 A1 | 7/2012 | Lynn et al. | | |
| 2020/0374013 A1* | 11/2020 | Jang | ........................ | H04R 17/00 |

FOREIGN PATENT DOCUMENTS

| KR | 10-0592598 B1 | 6/2006 |
|---|---|---|
| KR | 10-2006-0093512 A | 8/2006 |
| KR | 10-0783406 B1 | 12/2007 |
| KR | 10-2010-0084417 A | 7/2010 |
| KR | 10-1022234 B1 | 3/2011 |
| KR | 10-1056414 B1 | 8/2011 |
| KR | 10-1057917 B1 | 8/2011 |
| KR | 10-2012-0099900 A | 9/2012 |
| KR | 10-1437505 B1 | 9/2014 |
| KR | 10-2018-0006653 A | 1/2018 |
| KR | 10-1881393 B1 | 7/2018 |
| KR | 10-2018-0121067 A | 11/2018 |

* cited by examiner

ELECTRONIC APPARATUS INCLUDING ANTENNA AND AUDIO INTERFACE

CROSS-REFERENCE TO RELATED APPLICATION(S)

This application is a continuation application, claiming priority under § 365(c), of an International application No. PCT/KR2022/000597, filed on Jan. 13, 2022, which is based on and claims the benefit of a Korean patent application number 10-2021-0013428, filed on Jan. 29, 2021, in the Korean Intellectual Property Office, the disclosure of which is incorporated by reference herein in its entirety.

BACKGROUND

1. Field

The disclosure relates to an electronic apparatus. More particularly, the disclosure relates to an electronic apparatus including an antenna and an audio interface.

2. Description of the Related Art

Electronic apparatuses may include a plurality of antennas to provide mobile communication services of different frequency bands using one electronic apparatus while being miniaturized and lightweight. The electronic apparatus may include an audio interface for connection with an external electronic apparatus, such as an earphone.

The above information is presented as background information only to assist with an understanding of the disclosure. No determination has been made, and no assertion is made, as to whether any of the above might be applicable as prior art with regard to the disclosure.

SUMMARY

When an antenna is positioned adjacent to an audio interface, interference may occur between the antenna and the audio interface, and thus performance of the antenna may be degraded or communication noise may be generated. For example, the communication noise may be generated when a transmission period is included in an audible frequency band that a user is able to hear, and the generated communication noise may be introduced into the audio interface to be transmitted to an earphone.

Aspects of the disclosure are to address at least the above-mentioned problems and/or disadvantages and to provide at least the advantages described below. Accordingly, an aspect of the disclosure is to provide an electronic apparatus capable of blocking or suppressing noise in an audible frequency band and preventing or suppressing performance degradation of an antenna caused by an audio signal line.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a housing having a first surface, an antenna configured to transmit and receive a wireless signal using at least a part of the first surface, an interface that is connectable to an external terminal of an external apparatus via an audio connector formed on the first surface and configured to provide a detection signal indicating whether a connection with the external terminal is made, a processor configured to process an audio signal received from the external terminal of the external apparatus via the interface, a signal line extending from the interface, a noise filter connected to the processor, a matching element, and a switch configured to electrically connect one of the noise filter or the matching element to the signal line, based on the detection signal.

In accordance with another aspect of the disclosure, a method of controlling an electronic apparatus is provided. The method includes identifying whether an external apparatus is connected to an audio connector, connecting the audio connector to the processor via a noise filter using a switch based on that the external apparatus is connected to the audio connector, wherein the noise filter blocks noise introduced from an antenna of the electronic apparatus, and connecting the audio connector to a matching element using the switch based on that the external apparatus is not connected to the audio connector, wherein the matching element adjusts a resonant frequency of resonance caused by a signal line so that the resonant frequency of the resonance caused by the signal line deviates from an operating frequency band of the antenna.

In accordance with another aspect of the disclosure, an electronic apparatus is provided. The electronic apparatus includes an antenna, an audio connector formed on one side of the antenna, a processor configured to process an audio signal received via the audio connector, a signal line extending from the audio connector, a noise filter connected to the processor, a matching element, and a switch configured to connect the signal line to the noise filter in response to that the external apparatus is coupled to the audio connector, and connect the signal line to the matching element in response to that the external apparatus is not coupled to the audio connector. An inductance of the noise filter may be different from an inductance of the matching element.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
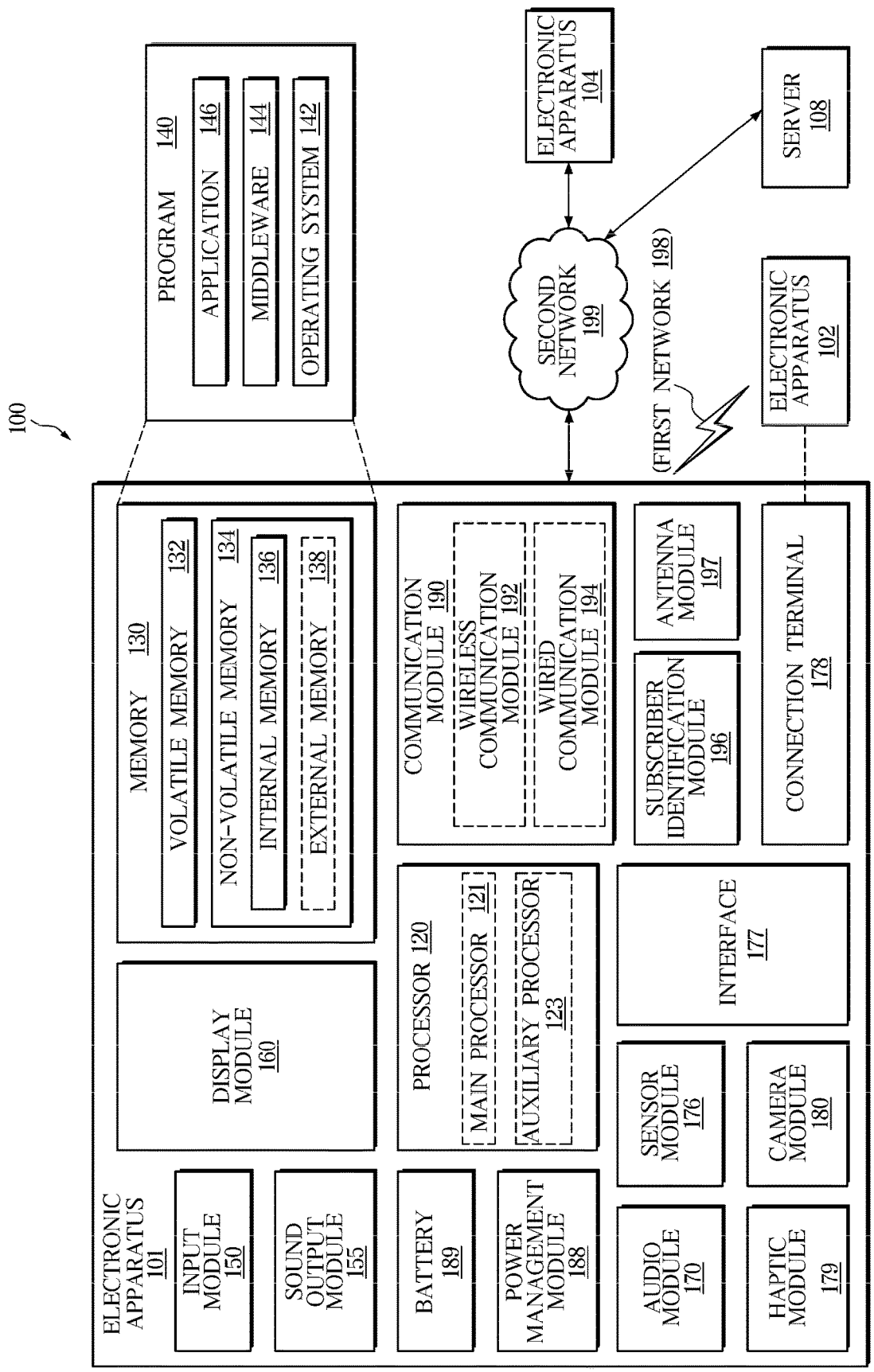
FIG. 1 is a block diagram of an electronic apparatus in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic apparatus according to various embodiments disclosed in the present document may include various types of apparatuses. The electronic apparatus may include, for example, a portable communication apparatus (e.g., a smartphone), a computer apparatus, a portable multimedia apparatus, a mobile medical apparatus, a camera, a wearable apparatus, or a home appliance. The electronic apparatus according to the embodiment of the present document is not limited to the above-described apparatuses.

It should be understood that various embodiments of the present document and terms used in the embodiments are not intended to limit technologies disclosed in the present document to the particular forms, and the various embodiments should be construed to cover various modifications, equivalents, or alternatives of the corresponding embodiment. With regard to the description of the drawings, similar reference numerals may be used to refer to similar or related components. A singular form of a noun corresponding to an item may include one or more of the things, unless the relevant context clearly indicates otherwise. In the present document, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. Terms such as "1st" and "2nd," or "first" and "second" may be used to simply distinguish a corresponding component from another, and do not limit the components in another aspect (e.g., importance or order). When a component (e.g., a first component) is referred to, with or without the term "operatively" or "communicatively," as "coupled with," "coupled to," "connected with," or "connected to" another component (e.g., a second component), it means that the component may be coupled with the other component directly (e.g., wiredly), wirelessly, or via a third component.

The term "module," as used in various embodiments of the present document, may include a unit implemented in hardware, software, or firmware, and may interchangeably be used with terms such as, for example, logic, logic block, part, or circuitry. The module may be a single integral component, or a minimum unit or part thereof that performs one or more functions. For example, according to one embodiment, the module may be implemented in a form of an application-specific integrated circuit (ASIC).

Various embodiments of the present document may be implemented as software (e.g., a program 140) including one or more instructions that are stored in a storage medium (e.g., an internal memory 136 or an external memory 138) that is readable by a machine (e.g., an electronic apparatus 101). For example, a processor (e.g., a processor 120) of the machine (e.g., the electronic apparatus 101) may invoke at least one of the one or more instructions stored in the storage medium, and execute the instruction. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Here, the term "non-transitory" only means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to one embodiment, a method according to various embodiments disclosed in the present document may be included and provided in a computer program product. The computer program product may be bought and sold between a seller and a buyer as a product. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. In the case of online distribution, at least a part of the computer program product may be temporarily generated or at least temporarily stored in the machine-readable storage medium, such as memory of the manufacturer's server, a server of the application store, or a relay server.

According to various embodiments, each component (e.g., a module or program) of the components described above may include a single entity or a plurality of entities, and some of the plurality of entities may be separated and disposed in another component. According to various embodiments, one or more of the above-described components or operations may be omitted, or one or more other components or operations may be added. Alternatively or additionally, a plurality of components (e.g., modules or programs) may be integrated into a single component. In such a case, the integrated component may perform one or more functions of each of the plurality of components in the same or a similar manner as they are performed by a corresponding one of the plurality of components before the integration. According to various embodiments, operations performed by the module, the program, or another component may be performed sequentially, in parallel, repeatedly, or heuristically, or one or more of the operations may be performed in a different order or omitted, or one or more other operations may be added.

FIG. 1 is a block diagram of an electronic apparatus in a network environment 100 according to an embodiment of the disclosure.

Referring to FIG. 1, the electronic apparatus 101 in the network environment 100 may communicate with an electronic apparatus 102 via a first network 198 (e.g., a short-range wireless communication network), or communicate with at least one of an electronic apparatus 104 and a server 108 via a second network 199 (e.g., a long-range wireless communication network). According to one embodiment, the electronic apparatus 101 may communicate with the electronic apparatus 104 via the server 108. According to one embodiment, the electronic apparatus 101 may include a processor 120, a memory 130, an input module 150, a sound output module 155, a display module (or display) 160, an audio module 170, a sensor module 176, an interface 177, a connection terminal 178, a haptic module 179, a camera module 180 (which may include at least one camera), a power management module 188, a battery 189, a communication module 190, a subscriber identification module (SIM) 196, or an antenna module 197. In some embodiments, in the electronic apparatus 101, at least one (e.g., the connection terminal 178) of the components may be omitted or one or more other components may be added. In some embodiments, some (e.g., the sensor module 176, the camera module 180, or the antenna module 197) of the components may be integrated into a single component (e.g., the display module 160).

The processor 120 may execute, for example, software (e.g., the program 140) to control at least one other component (e.g., a hardware or software component) of the electronic apparatus 101 connected to the processor 120, and may perform various data processing or computations. According to one embodiment, as at least a part of the data processing or computations, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit or an application processor), and an auxiliary processor 123 (e.g., a graphics processing unit, a neural processing unit (NPU), an image signal processor, a sensor hub processor, or a communication processor) that is operable independently from, or in conjunction with the main processor 121. For example, when the electronic apparatus 101 includes the main processor 121 and the auxiliary processor 123, the auxiliary processor 123 may be configured to consume less power than the main processor 121, or to be specialized for a specified function. The auxiliary processor 123 may be implemented separately from, or as a part of, the main processor 121.

The auxiliary processor 123 may control at least some of functions or states related to at least one component (e.g., the display module 160, the sensor module 176, or the communication module 190) among the components of the electronic apparatus 101, instead of the main processor 121 while the main processor 121 is in an inactive (e.g., sleep) state, or together with the main processor 121 while the main processor 121 is in an active state (e.g., executing an application). According to one embodiment, the auxiliary processor 123 (e.g., an image signal processor or a communication processor) may be implemented as a part of another component (e.g., the camera module 180 or the communication module 190) functionally related to the auxiliary processor 123. According to one embodiment, the auxiliary processor 123 (e.g., a neural processing unit) may include a hardware structure specialized for processing an artificial intelligence model. The artificial intelligence model may be generated through machine learning. Such learning may be performed, for example, in the electronic apparatus 101 itself in which the artificial intelligence model is performed, and may be performed through a separate server (e.g., the server 108). A learning algorithm may include, for example, supervised learning, unsupervised learning, semi-supervised learning, or reinforcement learning, but the disclosure is not limited to the above-described example. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, and a combination of at least two of those elements, but the disclosure is not limited to the above-described example. In addition to the hardware structure, additionally or alternatively, the artificial intelligence model may include a software structure.

The memory 130 may store various pieces of data used by at least one component (e.g., the processor 120 or the sensor module 176) of the electronic apparatus 101. The data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system 142, middleware 144, or an application 146.

The input module 150 may receive a command or data to be used by the components of the electronic apparatus 101 (e.g., the processor 120) from the outside (e.g., a user) of the electronic apparatus 101. The input module 150 may include, for example, a microphone, a mouse, a keyboard, a key (e.g., a button), or a digital pen (e.g., a stylus pen).

The sound output module 155 may output a sound signal to the outside of the electronic apparatus 101. The sound output module 155 may include, for example, a speaker or receiver. The speakers may be used for general purposes, such as playing multimedia or playing a recording. The receiver may be used to receive an incoming call. According to one embodiment, the receiver may be implemented separately from or as a part of, the speaker.

The display module 160 may visually provide information to the outside (e.g., the user) of the electronic apparatus 101. The display module 160 may include, for example, a display, a hologram device, or a projector, and control circuitry to control a corresponding one of the display, hologram device, and projector. According to one embodiment, the display module 160 may include a touch sensor configured to sense a touch, or a pressure sensor configured to measure the intensity of force generated by the touch.

The audio module 170 may convert a sound into an electrical signal, or, conversely, an electrical signal into a sound. According to one embodiment, the audio module 170 may obtain the sound via the input module 150, or output the sound via the sound output module 155, or an external electronic apparatus (e.g., the electronic apparatus 102), for example, a speaker or headphone that is directly or wirelessly connected to the electronic apparatus 101.

The sensor module 176 may detect an operational state (e.g., power or temperature) of the electronic apparatus 101 or an environmental state (e.g., a state of the user) outside the electronic apparatus 101 and generate an electrical signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols that may be used for the electronic apparatus 101 to be connected with the external electronic apparatus (e.g., the electronic apparatus 102) directly or wirelessly. According to one embodiment, the interface 177 may include, for example, a high definition multimedia interface (HDMI), a universal serial bus (USB) interface, a secure digital (SD) card interface, or an audio interface.

The connection terminal 178 may include a connector through which the electronic apparatus 101 may be physically connected with the external electronic apparatus (e.g., the electronic apparatus 102). According to one embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or movement) or an electrical stimulus that may be recognized by the user through tactile sensation or kinesthetic sensation of the user. According to one embodiment, the haptic module 179 may include, for example, a motor, a piezoelectric element, or an electrical stimulation device.

The camera module 180 may capture a still image and a video. According to one embodiment, the camera module 180 may include one or more lenses, image sensors, image signal processors, or flashes.

The power management module 188 may manage power supplied to the electronic apparatus 101. According to one embodiment, the power management module 188 may be implemented as at least a part of, for example, a power management integrated circuit (PMIC).

The battery 189 may supply power to at least one component of the electronic apparatus 101. According to one embodiment, the battery 189 may include, for example, a primary cell that is not rechargeable, a secondary cell that is rechargeable, or a fuel cell.

The communication module 190 may support establishing a direct (e.g., wired) communication channel or a wireless communication channel between the electronic apparatus 101 and an external electronic apparatus (e.g., the electronic apparatus 102, the electronic apparatus 104, or the server 108) and performing communication via the established communication channel. The communication module 190 may include one or more communication processors that are operated independently from the processor 120 (e.g., an application processor) and support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication module). A corresponding communication module of these communication modules may communicate with the external electronic apparatus 104 via the first network 198 (e.g., a short-range communication network, such as Bluetooth, Wi-Fi direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN))). These various types of communication modules may be integrated into one component (e.g., a single chip), or may be implemented as multiple components (e.g., multi chips) separate from each other. The wireless communication module 192 may identify or authenticate the electronic apparatus 101 in the communication network, such as the first network 198 or the second network 199, using subscriber information (e.g., international mobile subscriber identity (IMSI)) stored in the subscriber identification module 196.

The wireless communication module 192 may support a 5G network evolved from a fourth generation (4G) network and a next generation communication technology, for example, a new radio (NR) access technology. The NR access technology may support high-speed transmission of high-capacity data enhanced mobile broadband (eMBB), minimization of terminal power and access to multiple terminals massive machine type communications (mMTC), or ultra-reliable and low-latency communications (URLLC). The wireless communication module 192 may support a high frequency band (e.g., a millimeter wave (mmWave) band), for example, to achieve a high data rate. The wireless communication module 192 may support various technologies for securing performance in a high frequency band, such as, for example, beamforming, massive array multiple-input and multiple-output (MIMO), and full-dimensional MIMO (FD-MIMO), an array antenna, analog beam-forming, or a large scale antenna. The wireless communication module 192 may support various requirements defined in the electronic apparatus 101, the external electronic apparatus (e.g., the electronic apparatus 104), or a network system (e.g., the second network 199). According to one embodiment, the wireless communication module 192 may support a peak data rate (e.g., 20 Gbps or more) for realizing enhanced mobile broadband (eMBB), a loss coverage (e.g., 164 dB or less) for realizing mMTC, or U-plane latency (e.g., 0.5 ms or less or a round trip of 1 ms or less for each of downlink (DL) and uplink (UL)) for realizing ultra-reliable and low latency communications (URLCC). According to various embodiments, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic apparatus). According to one embodiment, the antenna module 197 may include an antenna including a radiating element composed of a conductive material or a conductive pattern formed on a substrate (e.g., a printed circuit board (PCB)). According to one embodiment, the antenna module 197 may include a plurality of antennas (e.g., an array antenna). In such a case, at least one antenna appropriate for a communication scheme used in the communication network, such as the first network 198 or the second network 199, may be selected, for example, by the communication module 190 from the plurality of antennas. The signal or power may be transmitted or received between the communication module 190 and the external electronic apparatus via the selected at least one antenna. According to some embodiments, another component (e.g., a radio frequency integrated circuit (RFIC)) other than the radiating element may be additionally formed as a part of the antenna module 197.

According to various embodiments, the antenna module 197 may form a high frequency (e.g., mmWave) antenna module. According to one embodiment, the high frequency (e.g., mmWave) antenna module may include a PCB, an RFIC disposed on or adjacent to a first surface (e.g., a bottom surface) of the PCB and capable of supporting a specified high frequency band (e.g., a mmWave band), and a plurality of antennas (e.g., an array antenna) disposed on or adjacent to a second surface (e.g., a top surface or a side surface) of the PCB and capable of transmitting or receiving a signal in the specified high frequency band. For example, the plurality of antennas may include a patch array antenna and/or a dipole array antenna.

At least some of the components may be connected to each other and exchange signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, the command or data may be transmitted or received between the electronic apparatus 101 and the external electronic apparatus 104 via the server 108 connected to the second network 199. Each of the external electronic apparatuses 102 and 104 may be the same type as, or a different type from, the electronic apparatus 101. According to one embodiment, all or some of operations executed in the electronic apparatus 101 may be executed in one or more external electronic apparatuses of the external electronic apparatuses 102, 104, and 108. For example, when the electronic apparatus 101 should perform a function or a service automatically, or in response to a request from the user or other apparatus, the electronic apparatus 101, instead of executing by itself, or in addition to executing the function or the service, may request the one or more external electronic apparatuses to perform at least a part of the function or the service. The one or more external electronic apparatuses, which have received the request, may perform at least some of the requested function or service, or an additional function or service related to the request, and transmit the result of the performing to the electronic apparatus 101. The electronic apparatus 101 may provide the result, with or without further processing of the result, as at least part of a reply to the request. To this end, for example, technologies of cloud computing, distributed computing, mobile edge computing (MEC), or client-server computing may be used. For example, the electronic apparatus 101 may provide an ultra-low latency service using distributed computing or mobile edge computing. In another embodiment, the external electronic apparatus 104 may include an Internet of Things (IoT) device. The server 108 may be an intelligent server using machine learning and/or neural networks. According to one embodiment, the external electronic apparatus 104 or the server 108 may be included in the second network 199. The electronic apparatus 101 may be applied to an intelligent service (e.g., a smart home, a smart city, a smart car, or health care) based on a 5G communication technology and an IoT related technology.

Figure 2:
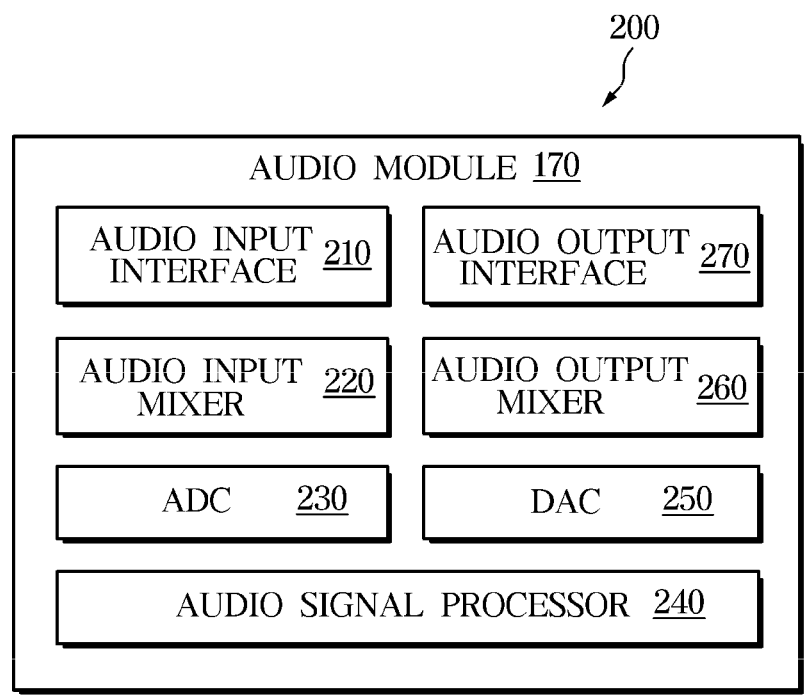
FIG. 2 is a block diagram of an audio module according to an embodiment of the disclosure.

FIG. 2 is a block diagram of an audio module according to an embodiment of the disclosure.

Referring to FIG. 2, in block diagram 200 the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic apparatus 101 via a microphone (e.g., a dynamic microphone, a condenser microphone, or a piezo microphone) that is configured as a part of the input module 150 or separately from the electronic apparatus 101. For example, when an audio signal is obtained from the external electronic apparatus 102 (e.g., a headset or a microphone), the audio input interface 210 may be connected to the external electronic apparatus 102 directly via the connection terminal 178 or wirelessly (e.g., Bluetooth communication) via the wireless communication module 192 to receive the audio signal.

According to one embodiment, the audio input interface 210 may receive a control signal (e.g., a volume adjustment signal received via an input button) related to the audio signal obtained from the external electronic apparatus 102. The audio input interface 210 may include a plurality of audio input channels and may receive different audio signal via a corresponding one of the plurality of audio input channels, respectively.

The audio input mixer 220 may mix the plurality of input audio signals into at least one audio signal. For example, according to one embodiment, the audio input mixer 220 may mix a plurality of analog audio signals input via the audio input interface 210 into at least one analog audio signal. According to one embodiment, the audio input mixer 220 may be implemented as an integrated circuit in the processor 120 of the electronic apparatus 101.

The ADC 230 may convert an analog audio signal into a digital audio signal. For example, according to one embodiment, the ADC 230 may convert an analog audio signal received via the audio input interface 210, or additionally or alternatively, an analog audio signal mixed via the audio input mixer 220 into a digital audio signal. According to one embodiment, the ADC 230 may be implemented as an integrated circuit in the processor 120 of the electronic apparatus 101.

The audio signal processor 240 may perform various processing on the digital audio signal received via the ADC 230, or a digital audio signal received from another component of the electronic apparatus 101. For example, according to one embodiment, the audio signal processor 240 may perform changing of a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to one embodiment, one or more functions of the audio signal processor 240 may be implemented in the form of an equalizer. According to one embodiment, the audio signal processor 240 may be implemented as an integrated circuit in the processor 120 of the electronic apparatus 101.

The DAC 250 may convert a digital audio signal into an analog audio signal. For example, according to one embodiment, the DAC 250 may convert the digital audio signal processed by the audio signal processor 240, or a digital audio signal obtained from another component (e.g., the processor 120 or the memory 130) of the electronic apparatus 101, into an analog audio signal. According to one embodiment, the DAC 250 may be implemented as an integrated circuit in the processor 120 of the electronic apparatus 101.

The audio output mixer 260 may mix a plurality of audio signals, which are to be output, into at least one audio signal. For example, according to one embodiment, the audio output mixer 260 may mix the analog audio signal converted by the DAC 250 and another analog audio signal (e.g., the analog audio signal received via the audio input interface 210) into at least one analog audio signal. According to one embodiment, the audio output mixer 260 may be implemented as an integrated circuit in the processor 120 of the electronic apparatus 101.

The audio output interface 270 may output the analog audio signal converted by the DAC 250 or, additionally or alternatively, the analog audio signal mixed by the audio output mixer 260, to the outside of the electronic apparatus 101 via the sound output module 155. The sound output module 155 may include, for example, a speaker, such as a dynamic driver or a balanced armature driver, or a receiver.

According to one embodiment, the audio module 170 may generate, without separately including the audio input mixer 220 or the audio output mixer 260, at least one digital audio signal by mixing a plurality of digital audio signals using at least one function of the audio signal processor 240.

According to one embodiment, the audio module 170 may include an audio amplifier (not shown) (e.g., a speaker amplifying circuit) capable of amplifying an analog audio signal input via the audio input interface 210, or an audio signal to be output via the audio output interface 270. According to one embodiment, the audio amplifier may be configured as a module separate from the audio module 170.

Figure 3:
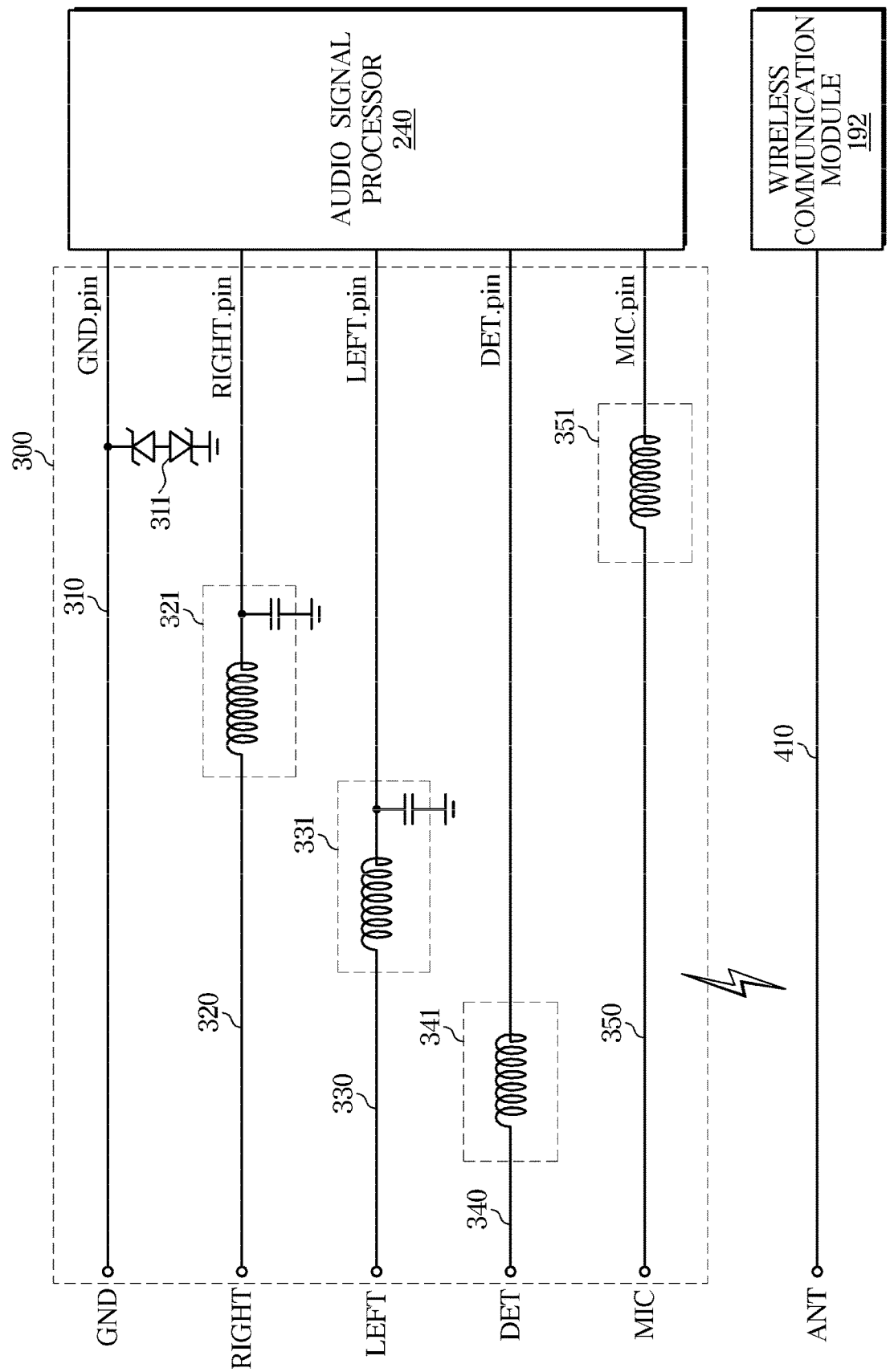
FIG. 3 illustrates an example of an audio input/output interface according to an embodiment of the disclosure.

FIG. 3 illustrates an example of an audio input/output interface according to an embodiment of the disclosure.

Figure 4:
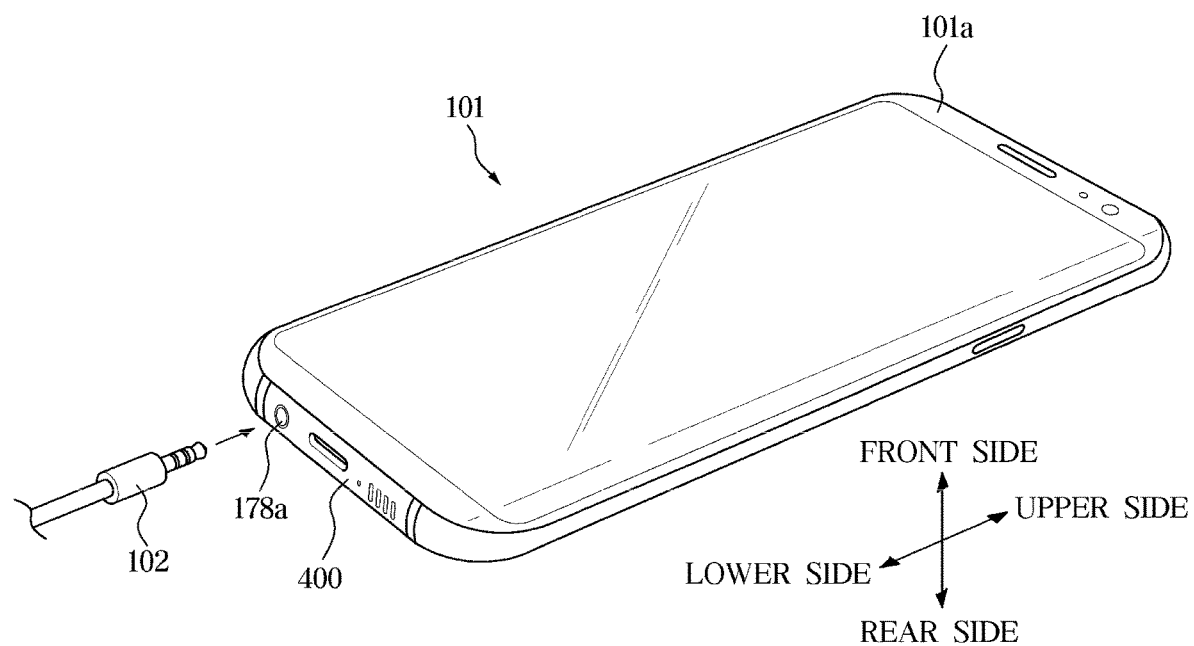
FIG. 4 illustrates an example of an exterior of the electronic apparatus according to an embodiment of the disclosure.

FIG. 4 illustrates an example of an exterior of the electronic apparatus according to an embodiment of the disclosure.

Figure 5:
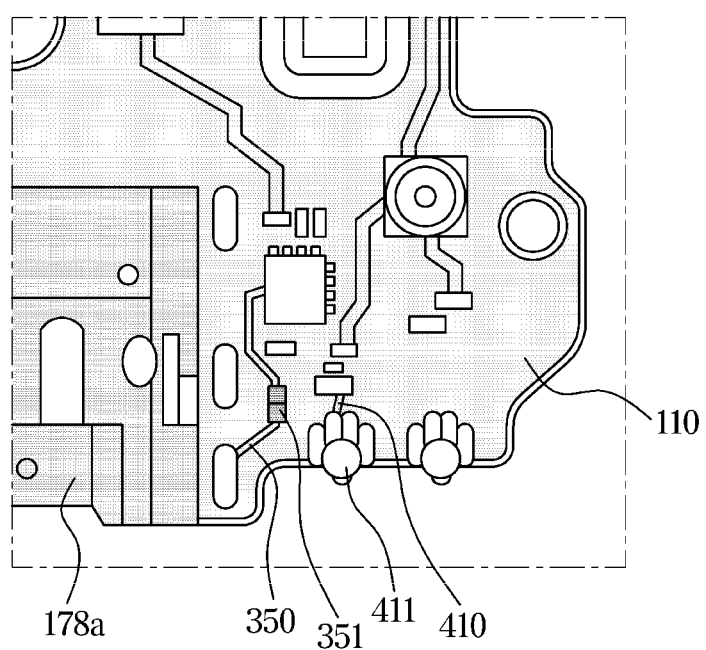
FIG. 5 illustrates an implementation example of the audio input/output interface illustrated in FIG. 3 according to an embodiment of the disclosure.

FIG. 5 illustrates an implementation example of the audio input/output interface illustrated in FIG. 3 according to an embodiment of the disclosure.

Referring to FIG. 3, the audio input/output interface 210 and 270 may include a plurality of signal lines 300 arranged so as to provide an audio signal to the external electronic apparatus 102 (e.g., an earphone, a headset, or a microphone) or to obtain an audio signal from the external electronic apparatus 102.

According to one embodiment, the plurality of signal lines 300 may include a ground line (GND) 310, a right signal line (RIGHT) 320, a left signal line (LEFT) 330, a detection signal line (DET) 340, or a microphone line (MIC) 350.

According to one embodiment, the electronic apparatus 101 may include an audio connector 178a physically and/or electrically in contact with the external electronic apparatus 102 (e.g., an earphone, a headset, or a microphone), and the plurality of signal lines 300 may extend from the audio connector 178a to the audio signal processor 240.

According to one embodiment, various circuits may be disposed in the plurality of signal lines 300 to reduce noise of an audio signal and protect an internal circuit (e.g., an audio signal processor) from external noise.

According to one embodiment, the plurality of signal lines 300 may be electrically connected to the audio input mixer 220, the ADC 230, the DAC 250, or the audio output mixer 260. According to one embodiment, the audio input mixer 220, the ADC 230, the DAC 250, or the audio output mixer 260 may be integrally formed with the audio signal processor 240.

According to one embodiment, the ground line 310 may extend from a ground terminal GND of the audio connector 178a to a ground pin (GND.pin) of the audio signal processor 240. For example, the ground line 310 may represent a signal ground. According to one embodiment, the ground line 310 may provide a reference potential (or reference voltage) of a signal transmitted through the right signal line 320, the left signal line 330, the detection signal line 340, and/or the microphone line 350.

According to one embodiment, a pair of Zener diodes 311 may be disposed on the ground line 310 to maintain a potential (or voltage) of the ground line 310 in a predetermined range. According to one embodiment, the pair of Zener diodes 311 may be disposed between the ground line 310 and the ground included in the electronic apparatus 101. According to one embodiment, the potential or voltage of the ground line 310 may be maintained in a range of a breakdown voltage of the Zener diode 311 due to the pair of Zener diodes 311.

According to one embodiment, the right signal line 320 may extend from a right signal terminal RIGHT of the audio connector 178a to a right signal pin (RIGHT.pin) of the audio signal processor 240. According to one embodiment, an audio signal output from the audio signal processor 240 may be transmitted to the audio connector 178a through the right signal line 320. According to one embodiment, the audio signal transmitted to the audio connector 178a may be transmitted to the external electronic apparatus 102 via the connection terminal 178.

According to one embodiment, a right audio filter 321 may be disposed on the right signal line 320 to reduce noise of an audio signal transmitted through the right signal line 320. According to one embodiment, the right audio filter 321 may include an inductive element (e.g., an inductor or a bead) disposed between the audio connector 178a and the audio signal processor 240 and/or a capacitive element (e.g., a capacitor or an electrolytic capacitor) disposed between the right signal line 320 and the ground included in the electronic apparatus 101.

According to one embodiment, the left signal line 330 may extend from a left signal terminal LEFT of the audio connector 178a to a left signal pin (LEFT.pin) of the audio signal processor 240. According to one embodiment, an audio signal output from the audio signal processor 240 may be transmitted to the audio connector 178a through the left signal line 330. According to one embodiment, the audio signal transmitted to the audio connector 178a may be transmitted to the external electronic apparatus 102 via the connection terminal 178.

According to one embodiment, a left audio filter 331 may be disposed on the left signal line 330. According to one embodiment, the left audio filter 331 may include an inductive element and/or a capacitive element.

According to one embodiment, the detection signal line 340 may extend from a detection terminal DET of the audio connector 178a to a detection signal pin (DET.pin) of the audio signal processor 240. According to one embodiment, the detection signal line 340 may transmit a detection signal indicating whether the external electronic apparatus 102 is coupled to the connection terminal 178 to the audio signal processor 240.

According to one embodiment, the connection terminal 178 may output the detection signal on the basis of whether the external electronic apparatus 102 is coupled to the connection terminal 178. According to one embodiment, the connection terminal 178 may include various elements capable of detecting that an audio jack of the external electronic apparatus 102 is inserted into the audio connector 178a. For example, the connection terminal 178 may include a switch for detecting that the audio jack is inserted into the audio connector 178a or a pair of contacts electrically connected when the audio jack is inserted into the audio connector 178a. According to one embodiment, the connection terminal 178 may output the detection signal in response to that the audio jack of the external electronic apparatus 102 is inserted into the audio connector 178a. According to one embodiment, the detection signal may be transmitted to the audio signal processor 240 through the detection signal line 340.

According to one embodiment, the connection terminal 178 may output the detection signal of a logic value "1" (or HIGH) when the audio jack of the external electronic apparatus 102 is inserted into the audio connector 178a, and may output the detection signal of a logic value "0" (or LOW) when the audio jack of the external electronic apparatus 102 is separated from the audio connector 178a.

According to one embodiment, a detection filter 341 may be disposed on the detection signal line 340 to reduce noise of the detection signal transmitted through the detection signal line 340. According to one embodiment, the detection filter 341 may include an inductive element and/or a capacitive element.

According to one embodiment, the microphone line 350 may extend from a microphone terminal MIC of the audio connector 178a to a microphone pin (MIC.pin) of the audio signal processor 240. According to one embodiment, the electronic apparatus 101 may receive an audio signal from the external electronic apparatus 102 via the audio connector 178a coupled to the external electronic apparatus 102. The audio signal received from the external electronic apparatus 102 may be transmitted to the audio signal processor 240 through the microphone line 350.

According to one embodiment, a microphone filter 351 may be disposed on the microphone line 350 to reduce noise of the audio signal transmitted through the microphone line 350. According to one embodiment, the microphone filter 351 may include an inductive element and/or a capacitive element.

According to one embodiment, the input audio signal transmitted from the microphone line 350 to the audio signal processor 240 may be more sensitive to noise.

According to one embodiment, an output audio signal transmitted through the right signal line 320 and/or the left signal line 330 may be sufficiently amplified by the audio signal processor 240. For example, the audio signal processor 240 may output the amplified audio signal so that the external electronic apparatus 102 outputs audio having a volume that is set by the user.

According to one embodiment, the input audio signal transmitted through the microphone line 350 is a signal converted into an electrical signal from a sound wave by the external electronic apparatus 102 (e.g., a microphone), and may pass through the microphone line 350 without being processed or amplified. According to one embodiment, the input audio signal may be amplified by the audio signal processor 240 after passing through the microphone line 350. Thus, when noise is mixed with the input audio signal while the input audio signal passes through the microphone line 350, the noise may be amplified together with the input audio signal by the audio signal processor 240. At this point, when noise in an audible frequency range (e.g., 20 to 20,000 Hz) that the user is able to hear is mixed, the quality of the input audio signal may be degraded.

According to one embodiment, noise may be mixed with the input audio signal of the microphone line 350 due to various causes. For example, due to the structure of the electronic apparatus 101, a wireless communication signal through the antenna module 197 of the electronic apparatus 101 may be mixed with the input audio signal of the microphone line 350 as noise.

According to one embodiment, the antenna module 197 may include an antenna 400 for wirelessly communicating with the external electronic apparatus 104 or the server 108 via the first network 198 or the second network 199. According to one embodiment, the antenna module 197 may further include an antenna line (ANT) 410 extending from the antenna 400 to the wireless communication module 192. At this point, the wireless communication signal passing through the antenna line 410 may be mixed with the input audio signal of the microphone line 350 as noise.

According to one embodiment, a time division multiplexing (TDM) wireless communication signal may be mixed with the input audio signal of the microphone line 350 as noise. In TDM wireless communication, an electronic apparatus may transmit and receive a transmission signal and a reception signal using the same frequency band. Thus, in the TDM wireless communication, the electronic apparatus may transmit a wireless signal during a transmission period and receive a wireless signal during a reception period.

As such, according to the TDM scheme in which the transmission period and the reception period are periodically alternated, noise in an audible frequency band that the user is able to hear may be generated. For example, global system for mobile communications (GSM) wireless communication may use a TDM scheme. According to a GSM scheme, a data frame may be changed every 4.6 ms. Thus, a voltage drop may occur every 4.6 ms, and accordingly, noise of about 217 Hz in an audible frequency band may be generated. As another example, noise of about 434 Hz, noise of about 651 Hz, and/or noise of about 868 Hz may be generated.

Hereinafter, noise in an audible frequency band generated due to TDM wireless communication may be referred to as "communication noise."

When the audio input/output interfaces 210 and 270 of the electronic apparatus 101 are positioned adjacent to the antenna 400 of the antenna module 197, "communication noise" may be mixed with the input audio signal transmitted through the microphone line 350.

Referring to FIG. 4, the electronic apparatus 101 according to one embodiment may include a housing 101a having a substantially rectangular parallelepiped box shape.

According to one embodiment, at least a part of one surface of the housing 101a may form the antenna 400. According to one embodiment, the one surface of the housing 101a may be formed of a conductive material (e.g., metal) through which electricity can flow, and at least a part of the one surface of the housing 101a including the conductive material may be electrically connected to the wireless communication module 192 as a radiating element of the antenna 400. For example, as shown in FIG. 4, at least a part of the housing 101a in a downward direction may be used as a radiating element of the antenna 400.

According to one embodiment, the audio connector 178a may be disposed on the one surface of the housing 101a. For example, as shown in FIG. 4, the audio connector 178a, which may be coupled to the external electronic apparatus 102 (e.g., an earphone, a headset, or a microphone), may be disposed on the housing 101a in the downward direction.

According to one embodiment, the antenna 400 may be formed on at least a part of the one surface of the housing 101a and the audio connector 178a may be disposed on the same surface as the antenna 400. According to one embodiment, since the audio connector 178a is provided on the one surface of the housing 101a on which the antenna 400 is formed, the plurality of signal lines 300 may be disposed adjacent to the antenna line 410.

Referring to FIG. 5, the electronic apparatus 101 may include a printed circuit board (PCB) 110 on which various electrical components are disposed. According to one embodiment, on the PCB 110, the wireless communication module 192 may be disposed, and a communication contact point 411 and an antenna line 410 for electrically connecting the antenna 400 formed on at least a part of the one surface of the housing 101a to the wireless communication module 192 may be disposed.

According to one embodiment, the audio connector 178a electrically connecting the electronic apparatus 101 to the external electronic apparatus 102 may be disposed on the PCB 110. The microphone line 350 extending from the audio connector 178a to the audio signal processor 240 may be disposed adjacent to the audio connector 178a.

According to one embodiment, the audio connector 178a may be disposed at a position adjacent to the communication contact point 411, and the microphone line 350 may also be disposed at a position adjacent to the antenna line 410. Thus, when the electronic apparatus 101 communicates wirelessly with the external electronic apparatus 104 in a TDM manner, communication noise may be introduced into the microphone line 350.

According to one embodiment, the microphone filter 351 may be disposed on the microphone line 350 to block communication noise. According to one embodiment, the microphone filter 351 may include an inductive element and/or a capacitive element. According to one embodiment, the microphone filter 351 may include a bead, an inductor, a capacitor, or an electrolytic capacitor.

According to one embodiment, communication noise that is introduced into the microphone line 350 from the antenna line 410 may be blocked or reduced due to the microphone filter 351. However, performance of the antenna 400 may be degraded due to the microphone filter 351.

According to one embodiment, when the external electronic apparatus 102 is separated from the audio connector 178a, the microphone filter 351 and the microphone line 350 may cause parasitic resonance. According to one embodiment, the microphone line 350 may act as a capacitive element of a resonant circuit, and the microphone filter 351 may act as an inductive element of the resonant circuit.

According to one embodiment, the microphone filter 351 and the microphone line 350 may cause parasitic resonance at a frequency similar to an operating frequency of the antenna 400 depending on an element included in the microphone filter 351.

When the microphone filter 351 and the microphone line 350 cause the parasitic resonance at the frequency similar to the operating frequency of the antenna 400, a wireless signal (electromagnetic wave), which is to be transmitted to a free space via the antenna 400 when transmitting the wireless signal, may be absorbed by the microphone filter 351 and the microphone line 350 instead of the free space. For example, when the antenna 400 transmits a wireless signal, the microphone filter 351 and the microphone line 350 may operate like a reception antenna (parasitic antenna). Thus, power with which the electronic apparatus 101 transmits the wireless signal to the free space may be lowered.

Further, when a wireless signal is received from the free space, the wireless signal may be absorbed by the microphone filter 351 and the microphone line 350, and power of the wireless signal received by the antenna 400 may be lowered. For example, when the antenna 400 receives a wireless signal, the microphone filter 351 and the microphone line 350 may operate as another reception antenna (parasitic antenna). As a result, the strength of the wireless signal received by the antenna 400 may be lowered.

Figure 6:
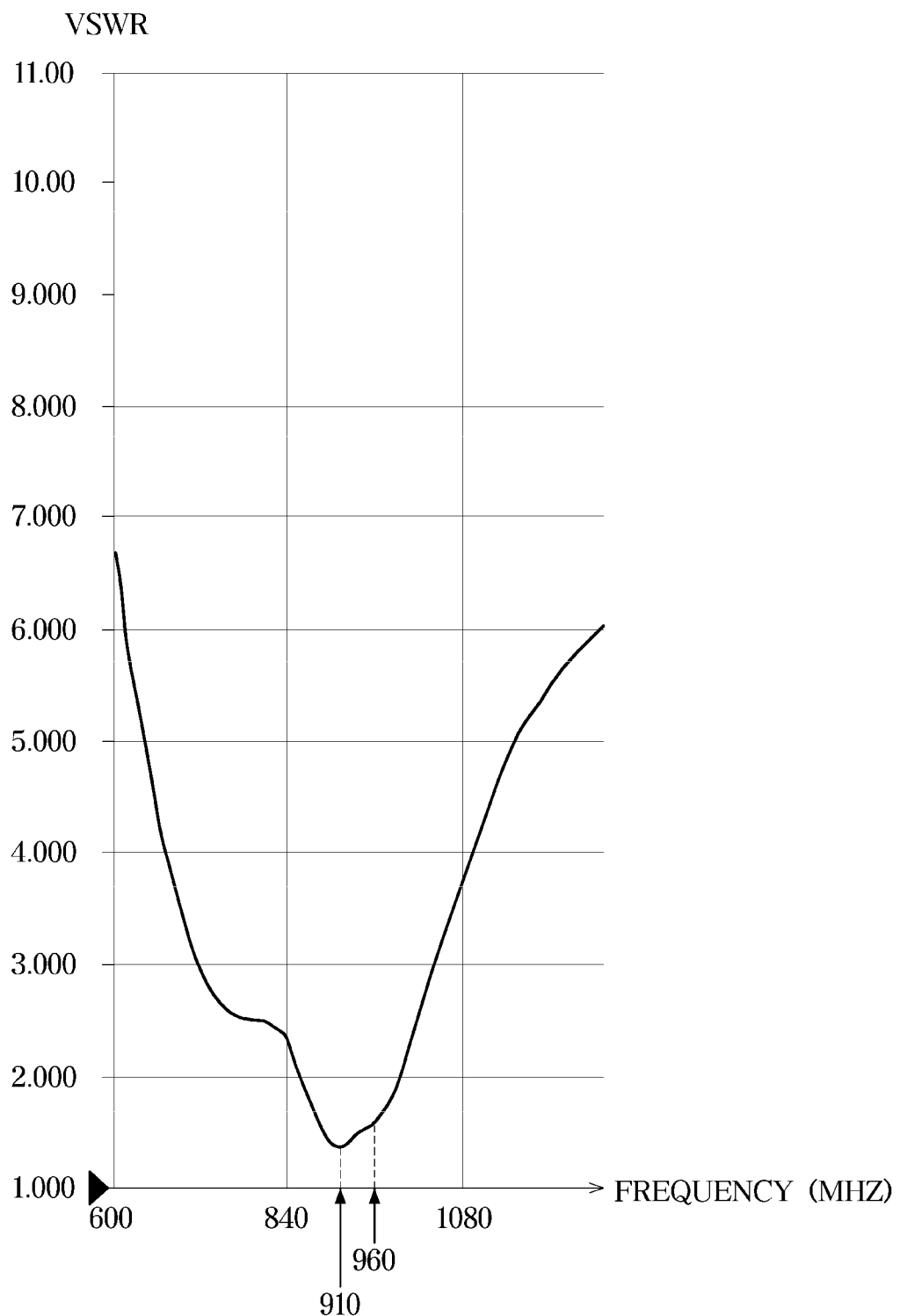
FIG. 6 illustrates antenna performance of the electronic apparatus including the audio input/output interface shown in FIG. 3 according to an embodiment of the disclosure.

FIG. 6 illustrates antenna performance of an electronic apparatus including an audio input/output interface shown in FIG. 3 according to an embodiment of the disclosure.

Referring to FIG. 6 may illustrate a voltage standing wave ratio (VSWR) of the antenna 400 due to the audio input/output interfaces 210 and 270 including the microphone filter 351. Here, the VSWR is a value that expresses a reflection coefficient or S11 (or S22) differently, and may refer to a height ratio of a standing wave generated by reflection. The VSWR may have a value of "1" in the case of full-reflection, and the VSWR may have a value of "infinity" in the case of anti-reflection. In addition, it may be assumed that the microphone filter 351 includes an inductor having an inductance value (e.g., about 33 nano-Henry (nH)) for blocking or suppressing communication noise.

Referring to FIG. 6, the VSWR has a value less than about "2" in a frequency band between 834 MHz (mega-Hertz) and 960 MHz, which is a frequency band of GSM wireless communication. In addition, it is confirmed that the VSWR has a minimum value at about 910 MHz.

Further, referring to FIG. 6, it is confirmed that the VSWR has another peak value at about 960 MHz. In other words, it is confirmed that the VSWR has a peak value at about 910 MHz and a peak value at about 960 MHz. Here, the peak value at about 960 MHz may be a peak value generated due to parasitic resonance caused by the microphone line 350 and the microphone filter 351. In other words, a resonant frequency of the parasitic resonance caused by the microphone line 350 and the microphone filter 351 is positioned in a frequency band of the GSM wireless communication or positioned adjacent to the frequency band of the GSM wireless communication, which may degrade performance of the antenna 400.

As such, the microphone filter 351 for reducing communication noise may degrade the performance of the antenna 400, which may cause difficulties in designing the microphone filter 351.

Figure 7:
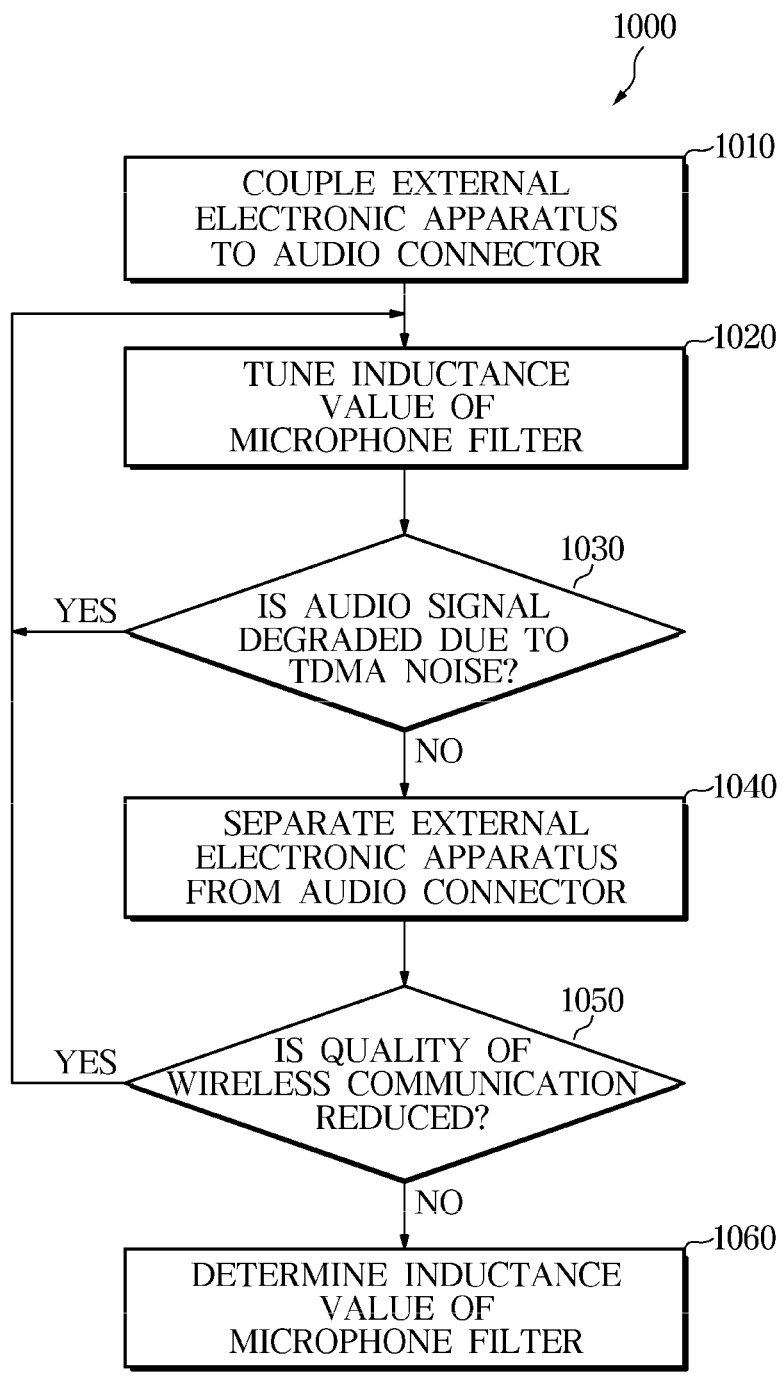
FIG. 7 illustrates a method of improving audio quality and communication quality using a noise filter of the audio input/output interface shown in FIG. 3 according to an embodiment of the disclosure.

FIG. 7 illustrates a method of improving audio quality and communication quality using a noise filter of the audio input/output interface shown in FIG. 3 according to an embodiment of the disclosure.

Referring to FIG. 7, in the method 1000 the external electronic apparatus 102 may be coupled to the audio connector 178*a* of the electronic apparatus 101 at operation 1010.

An inductance value of the microphone filter 351 included in the electronic apparatus 101 may be tuned at operation 1020.

It may be identified whether an audio signal input through the microphone terminal MIC is degraded due to communication noise (e.g., TDMA noise) at operation 1030.

According to one embodiment, the processor may perform wireless communication through the antenna 400 while the external electronic apparatus 102 is coupled to the audio connector 178*a*, and evaluate the communication noise introduced through the microphone pin MIC.pin of the audio signal processor 240.

When it is identified that the audio signal is degraded due to the communication noise (YES at operation 1030), the inductance value of the microphone filter 351 included in the electronic apparatus 101 may be tuned at operation 1020.

According to one embodiment, the processor may change an inductance value of an inductance element included in the microphone filter in response to identifying that the audio signal is degraded. For example, the microphone filter may include a plurality of connectable inductance elements, and the processor may change the inductance value of the microphone filter by selectively connecting the plurality of inductance elements.

When the audio signal degradation due to the communication noise is not identified (NO at operation 1030), the external electronic apparatus 102 may be separated from the audio connector 178*a* of the electronic apparatus 101 at operation 1040.

It may be identified whether the quality of the wireless communication through the antenna 400 is reduced at operation 1050.

According to one embodiment, the processor may perform wireless communication through the antenna 400 while the external electronic apparatus 102 is separated from the audio connector 178*a*, and evaluate the quality of the wireless communication.

For example, the processor may measure the strength of a wireless communication signal received by the antenna 400 and evaluate the quality of the wireless communication using a received signal strength indication (RSSI) or the like.

Once the quality reduction of the wireless communication is identified (YES at operation 1050), the inductance value of the microphone filter 351 included in the electronic apparatus 101 may be tuned at operation 1020.

According to one embodiment, the processor may change the inductance value of the inductance element included in the microphone filter in response to identifying that the quality of the wireless communication is reduced.

When quality reduction of the wireless communication is not identified (NO at operation 1050), the inductance value of the microphone filter 351 may be determined at operation 1060.

As described above, the inductance (or capacitance) of the microphone filter 351 may be determined as a value that satisfies both of two design conditions of the audio quality and the wireless communication quality. Since one microphone filter 351 should satisfy both the audio quality and the wireless communication quality, it may be difficult to provide both the best audio quality and the best wireless communication quality.

Figure 8:
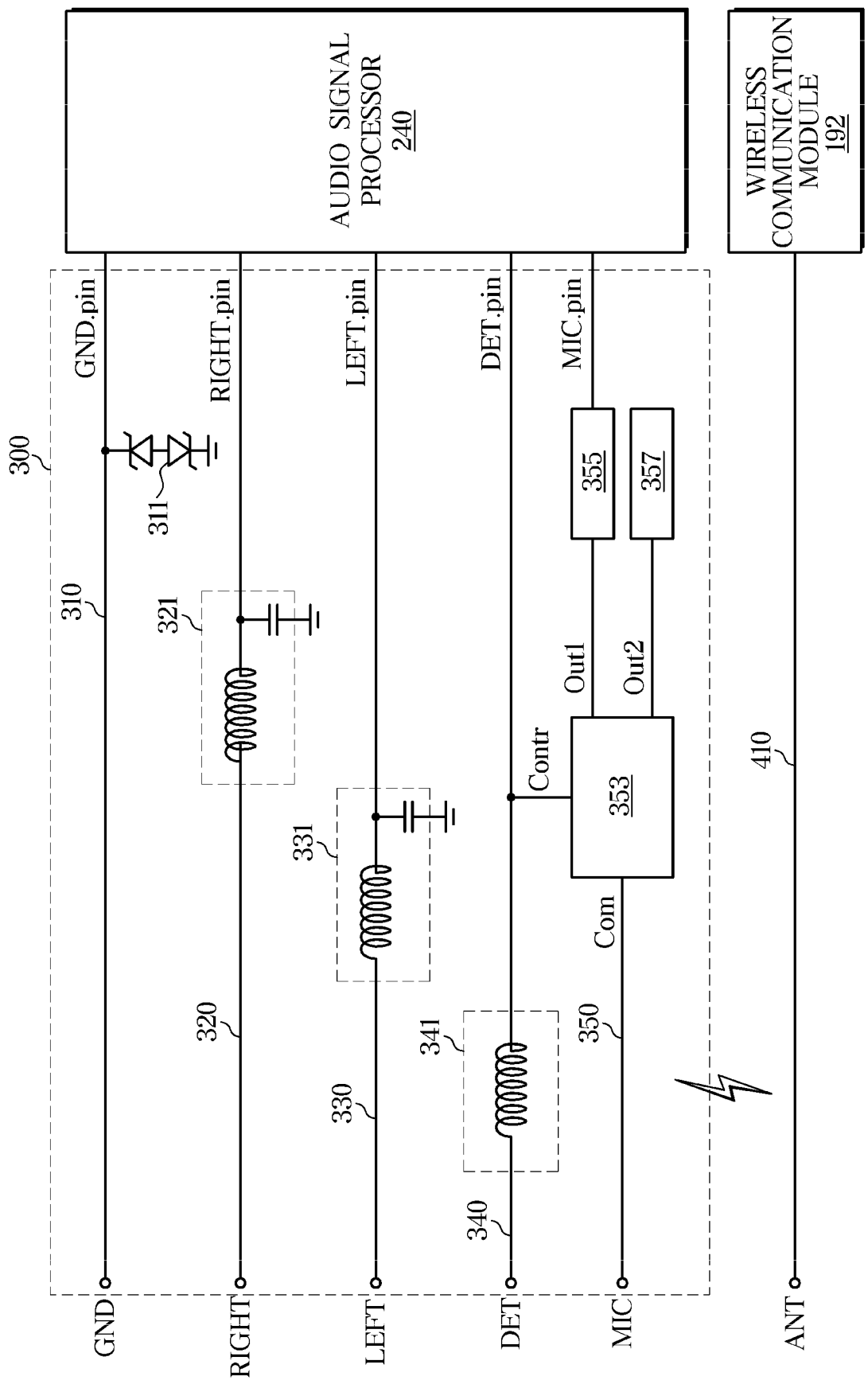
FIG. 8 illustrates an example of the audio input/output interface according to an embodiment of the disclosure.

FIG. 8 illustrates an example of the audio input/output interface according to an embodiment of the disclosure.

Figure 9:
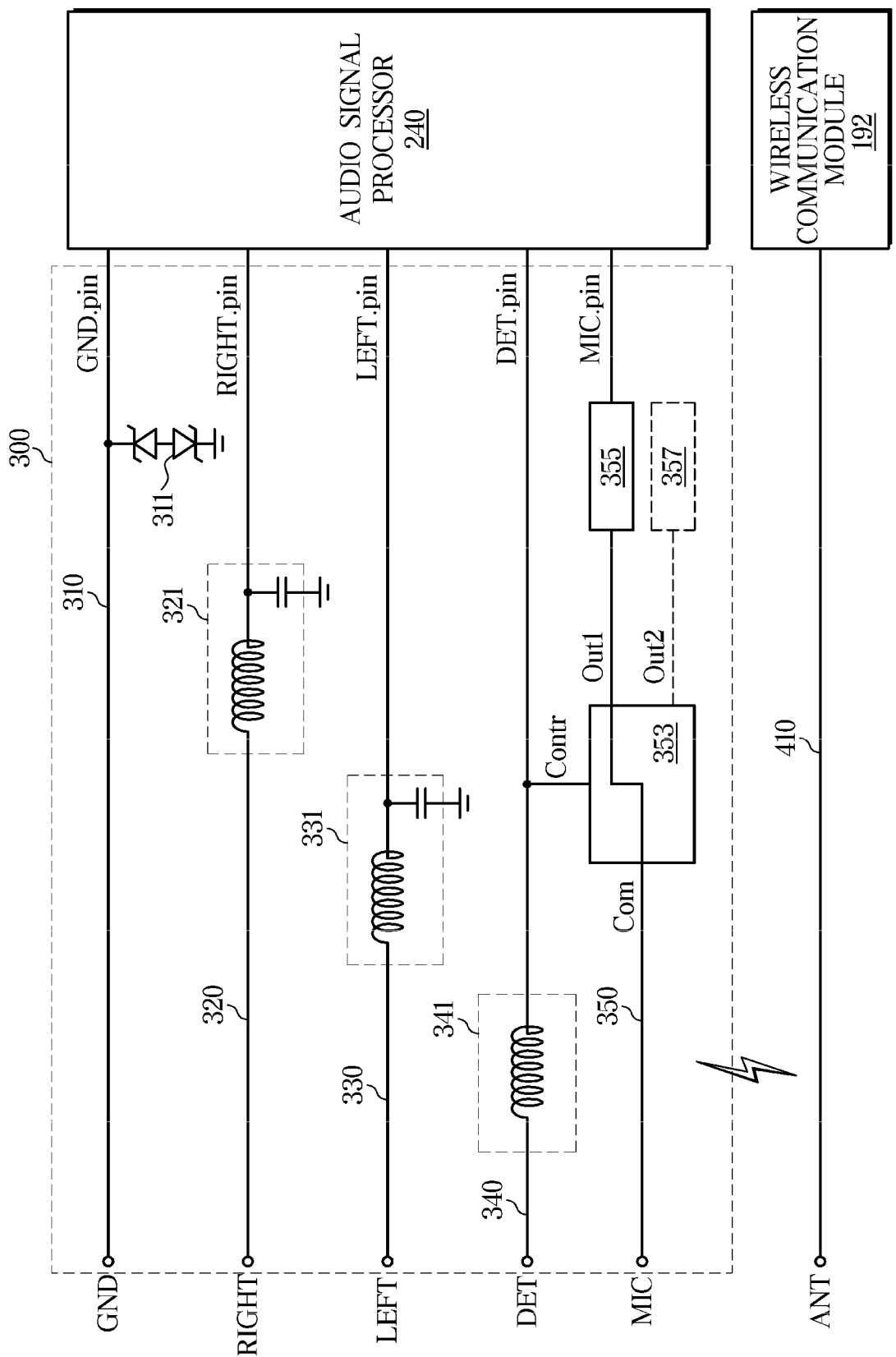
FIG. 9 illustrates an equivalent circuit in which an external electronic apparatus is coupled to the audio input/output interface shown in FIG. 8 according to an embodiment of the disclosure.

FIG. 9 illustrates an equivalent circuit in which an external electronic apparatus is coupled to the audio input/output interface shown in FIG. 8 according to an embodiment of the disclosure.

Figure 10:
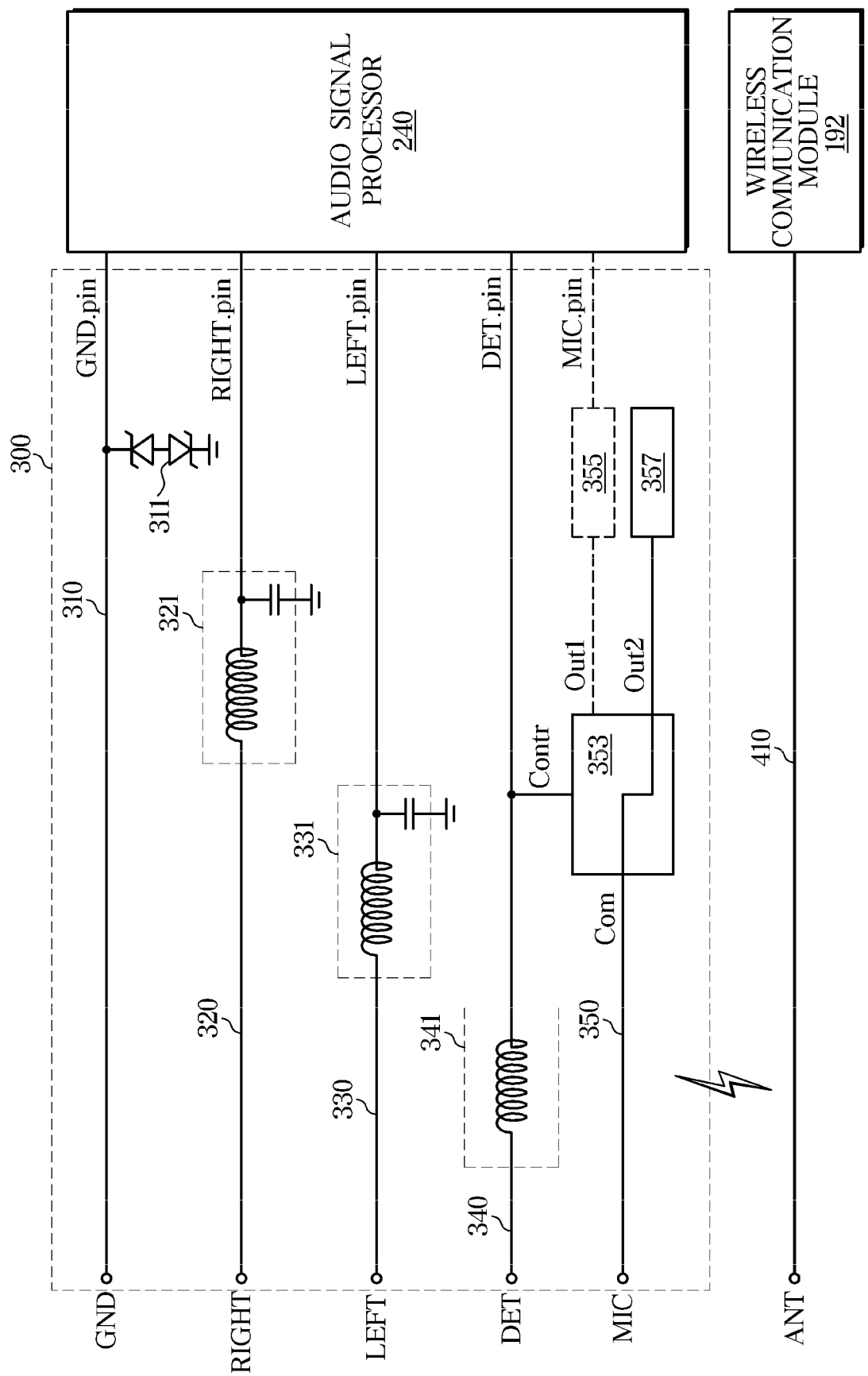
FIG. 10 illustrates an equivalent circuit in which the external electronic apparatus is separated from the audio input/output interface shown in FIG. 8 according to an embodiment of the disclosure.

FIG. 10 illustrates an equivalent circuit in which the external electronic apparatus is separated from the audio input/output interface shown in FIG. 8 according to an embodiment of the disclosure.

Referring to FIG. 8, the audio input/output interfaces 210 and 270 may include a plurality of signal lines 300 arranged so as to provide an audio signal to the external electronic apparatus 102 (e.g., an earphone, a headset, or a microphone) or to obtain an audio signal from the external electronic apparatus 102.

According to one embodiment, the plurality of signal lines 300 may include a ground line 310, a right signal line 320, a left signal line 330, a detection signal line 340, or a microphone line 350. Descriptions of the ground line 310, the right signal line 320, the left signal line 330, and the detection signal line 340 may be replaced by the descriptions of the ground line, the right signal line, the left signal line, and the detection signal line illustrated in FIG. 3.

According to one embodiment, the microphone line 350 may extend from the microphone terminal MIC of the audio connector 178*a* to the microphone pin MIC.pin of the audio signal processor 240. According to one embodiment, the audio signal received from the external electronic apparatus 102 may be transmitted to the audio signal processor 240 through the microphone line 350.

According to one embodiment, a switch 353 may be disposed on the microphone line 350, and the switch 353 may be electrically connected to a noise filter 355 or a matching element 357.

According to one embodiment, the switch 353 may include a three-way switch including a common terminal Com, a first output terminal (Out1), or a second output terminal Out2 through which a signal is input and/or output. According to one embodiment, the switch 353 may further include a control terminal (Contr) to which a control signal for controlling an operation of the switch 353 is received, a power terminal connected to a power source, or a ground terminal connected to the ground.

According to one embodiment, the control terminal Contr of the switch 353 may be electrically connected to the detection terminal DET of the audio connector 178*a*. According to one embodiment, a detection signal input through the detection terminal DET may be input to the control terminal Contr of the switch 353.

According to one embodiment, the switch 353 may electrically connect the common terminal (Com) to the first output terminal Out1 or may electrically connect the common terminal Com to the second output terminal Out2 on the basis of the detection signal input through the control terminal Contr.

According to one embodiment, the connection terminal 178 may output the detection signal of a logic value "1" (or HIGH) when the audio jack of the external electronic apparatus 102 is inserted into the audio connector 178*a*, and may output the detection signal of a logic value "0" (or LOW) when the audio jack of the external electronic apparatus 102 is separated from the audio connector 178*a*. According to one embodiment, the switch 353 may connect the common terminal Com to the first output terminal Out1 when the detection signal of the logic value "1" (or HIGH) is input to the control terminal Contr, and may connect the common terminal Com to the first output terminal Out1 when the detection signal of the logic value "0" (or LOW) is input to the control terminal Contr.

According to one embodiment, the common terminal Com of the switch 353 may be electrically connected to the microphone terminal MIC (or microphone line) of the audio connector 178a. According to one embodiment, an input audio signal input from the external electronic apparatus 102 through the microphone terminal MIC may be input to the common terminal Com of the switch 353.

According to one embodiment, the first output terminal Out1 of the switch 353 may be electrically connected to the microphone pin MIC.pin of the audio signal processor 240 via the noise filter 355. According to one embodiment, the first output terminal Out1 of the switch 353 may be electrically connected to one end of the noise filter 355, and the other end of the noise filter 355 may be connected to the microphone pin MIC.pin of the audio signal processor 240.

According to one embodiment, the noise filter 355 may block communication noise from being input to the audio signal processor 240 along with an audio signal while receiving the audio signal from the external electronic apparatus 102 via the audio connector 178a.

According to one embodiment, the noise filter 355 may be disposed between the first output terminal Out1 of the switch 353 and the microphone pin MIC.pin of the audio signal processor 240. According to one embodiment, one end of the noise filter 355 may be electrically connected to the first output terminal Out1 of the switch 353, and the other end of the noise filter 355 may be connected to the microphone pin MIC.pin of the audio signal processor 240.

According to one embodiment, the noise filter 355 may include an inductive element and/or a capacitive element to block or suppress communication noise.

According to one embodiment, the noise filter 355 may include a bead or an inductor. According to one embodiment, an inductance value of the inductive element included in the noise filter 355 may be determined based on an arrangement of the microphone line 350 and the antenna line 410, such as a distance between the microphone line 350 and the antenna line 410. According to one embodiment, the inductance value of the inductive element may be about 100 nH (nano-Henry) or less. According to one embodiment, for example, the inductance value of the inductive element may be a value between about 30 nH and 50 nH.

According to one embodiment, the noise filter 355 may include a capacitor or an electrolytic capacitor. According to one embodiment, a capacitance value of the capacitive element included in the noise filter 355 may depend on an arrangement of the microphone line 350 and the antenna line 410 or the like. According to one embodiment, the capacitance value of the capacitive element may be less than or equal to about 100 pF (pico-Farad).

According to one embodiment, the second output terminal Out2 of the switch 353 may be electrically connected to the matching element 357.

According to one embodiment, the matching element 357 may prevent or suppress the microphone line 350 from causing parasitic resonance, which may degrade performance of the antenna 400, while the external electronic apparatus 102 is separated from the audio connector 178a.

According to one embodiment, the microphone line 350 may serve as a capacitive element of the parasitic resonance. According to one embodiment, the matching element 357 may adjust a resonant frequency of the parasitic resonance caused by the microphone line 350 such that the resonant frequency deviates from a range of an operating frequency of the antenna 400 or a frequency range adjacent to the operating frequency of the antenna 400.

According to one embodiment, the matching element 357 may include an inductive element and/or a capacitive element. For example, the matching element 357 may include at least one of a bead, an inductor, a capacitor, and an electrolytic capacitor.

According to one embodiment, an inductance value of the inductive element (the bead or inductor) may be determined based on the arrangement of the microphone line 350 and the antenna line 410, such as a length of the microphone line 350. According to one embodiment, the inductance value of the inductive element may be about 100 nH or less. For example, the inductance value of the inductive element may be a value between about 20 nH and about 30 nH. As another example, the inductance value of the inductive element may be about 22 nH.

According to one embodiment, a capacitance value of the capacitive element (the capacitor or electrolytic capacitor) may be determined based on an arrangement of the microphone line 350 and the antenna line 410. According to one embodiment, the capacitance value of the capacitive element may be less than or equal to about 100 pF (pico-Farad).

According to one embodiment, the noise filter 355 may be designed to block communication noise, and the matching element 357 may be designed such that the resonant frequency of the microphone line 350 deviates from the operating frequency of the antenna 400.

According to one embodiment, based on whether the external electronic apparatus 102 (e.g., an earphone, a headset, or a microphone) is coupled with the electronic apparatus 101 via the connection terminal 178, one of the noise filter 355 and the matching element 357 may be electrically connected to the microphone terminal MIC of the audio connector 178a, and the other one may not be electrically connected to the microphone terminal MIC of the audio connector 178a.

According to one embodiment, when the external electronic apparatus 102 (e.g., an earphone, a headset, or a microphone) is coupled with the electronic apparatus 101 via the connection terminal 178, as shown in FIG. 9, the noise filter 355 may be electrically connected to the microphone terminal MIC of the audio connector 178a and the matching element 357 may not be electrically connected to the microphone terminal MIC of the audio connector 178a. When the audio jack of the external electronic apparatus 102 is inserted into the audio connector 178a, the connection terminal 178 may output a detection signal of a logic value "1" (or HIGH) via the detection signal line 340. The switch 353 may electrically connect the common terminal Com to the first output terminal Out1 in response to the detection signal of the logic value "1" (or HIGH). As a result, an audio signal input through the microphone terminal MIC may be transmitted to the audio signal processor 240 via the noise filter 355.

According to one embodiment, the noise filter 355 may block or suppress communication noise mixed with the audio signal while the audio signal passes through the microphone line 350.

According to one embodiment, when the external electronic apparatus 102 (e.g., an earphone, a headset, or a microphone) is separated from the electronic apparatus 101, as shown in FIG. 10, the noise filter 355 is not electrically connected to the microphone terminal MIC of the audio connector 178a, and the matching element 357 may be electrically connected to the microphone terminal MIC of the audio connector 178a. When the audio jack of the external electronic apparatus 102 is separated from the audio connector 178a, the connection terminal 178 may output a detection signal of a logic value "0" (or LOW) via the detection signal line 340. The switch 353 may electrically connect the common terminal Com to the second output terminal Out2 in response to the detection signal of the logic value "0" (or LOW). Thus, the microphone line 350 may be electrically connected to the matching element 357.

According to one embodiment, the noise filter 355 and the matching element 357 may be disposed on the PCB 110. According to one embodiment, a distance between the noise filter 355 and the communication contact point 411 may be greater than a distance between the matching element 357 and the communication contact point 411. For example, the noise filter 355 may be disposed further away from the communication contact point 411 than the matching element 357.

According to one embodiment, the matching element 357 may cause the resonant frequency of the parasitic resonance caused by the microphone line 350 to deviate from a range of the operating frequency of the antenna 400 or a frequency range adjacent to the operating frequency of the antenna 400. Thus, the performance degradation of the antenna 400 may be prevented or suppressed.

Figure 11:
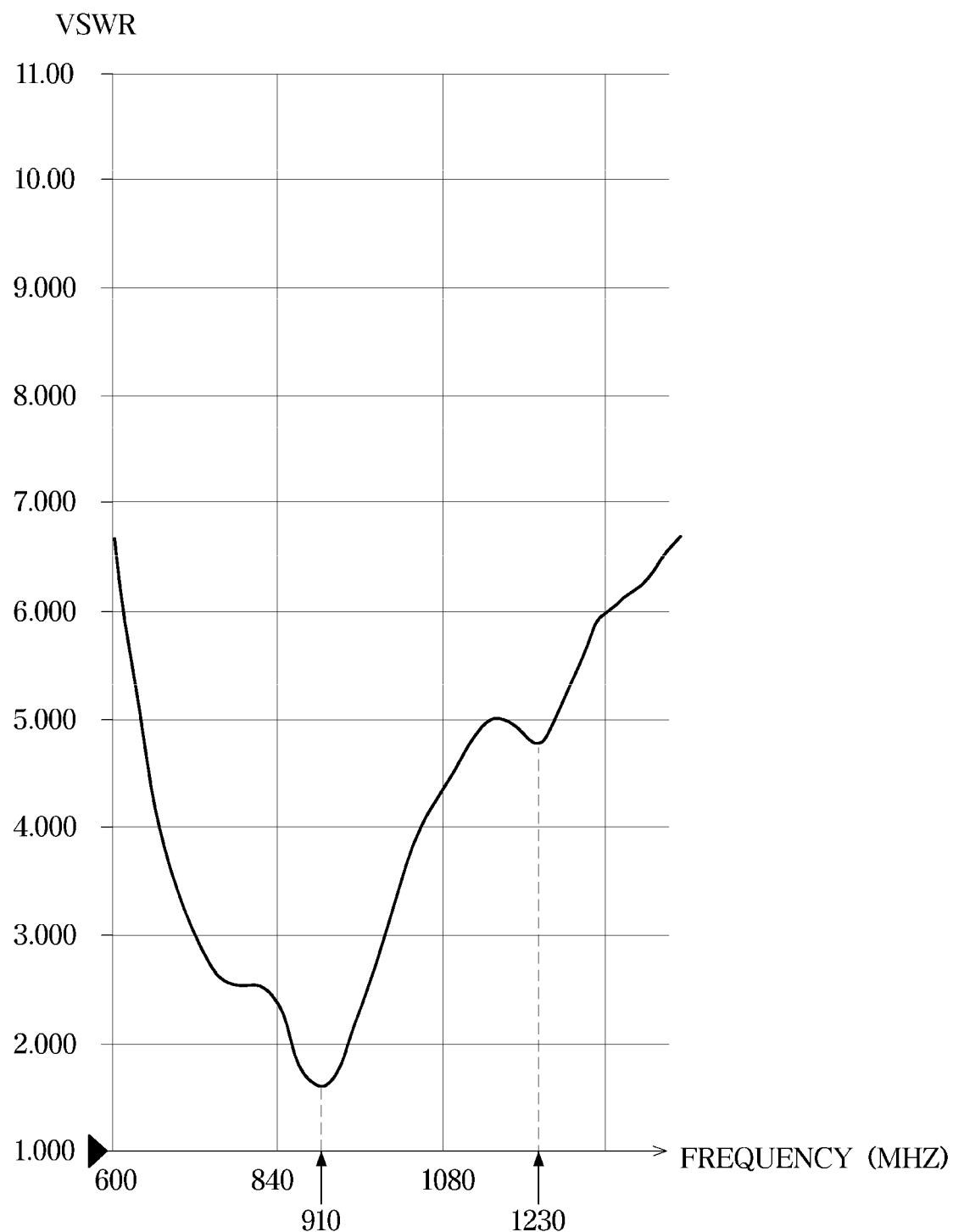
FIG. 11 illustrates antenna performance of the electronic apparatus including the audio input/output interface shown in FIG. 8 according to an embodiment of the disclosure.

FIG. 11 illustrates antenna performance of an electronic apparatus including an audio input/output interface shown in FIG. 8 according to an embodiment of the disclosure.

Referring to FIG. 11 may illustrate a VSWR of the antenna 400 due to the audio input/output interfaces 210 and 270 including the noise filter 355 and the matching element 357. In addition, it is assumed that the noise filter 355 includes an inductor having an inductance value (e.g., about 33 nH) for blocking or suppressing communication noise, and the matching element 357 includes an inductor having an inductance value (e.g., about 22 nH) for suppressing antenna performance from being reduced.

Referring to FIG. 11, the VSWR has a value less than about "2.5" in a frequency band between about 834 MHz and about 960 MHz, which is a frequency band of GSM wireless communication. In addition, it is confirmed that the VSWR has a minimum value at about 910 MHz.

In addition, it is confirmed that the VSWR has another peak value at about 1230 MHz. In other words, it is confirmed that the VSWR has a peak value at 910 MHz and a peak value at 1230 MHz. Here, the peak value at 1230 MHz may be a peak value generated due to parasitic resonance caused by the microphone line 350 and the matching element 357. In other words, a resonant frequency of the parasitic resonance caused by the microphone line 350 and the matching element 357 is positioned outside the frequency band of GSM wireless communication, which may not affect the performance of the antenna 400.

According to one embodiment, the electronic apparatus 101 may include the noise filter 355 for reducing communication noise and the matching element 357 for suppressing performance reduction of the antenna due to parasitic resonance. In addition, a reactance (inductance) value of the noise filter 355 for reducing the communication noise may be set, and a reactance (inductance) value of the matching element 357 for maintaining the performance of the antenna may be set independently. Thus, the electronic apparatus 101 may provide the user with the best audio quality and the best wireless communication quality.

Figure 12:
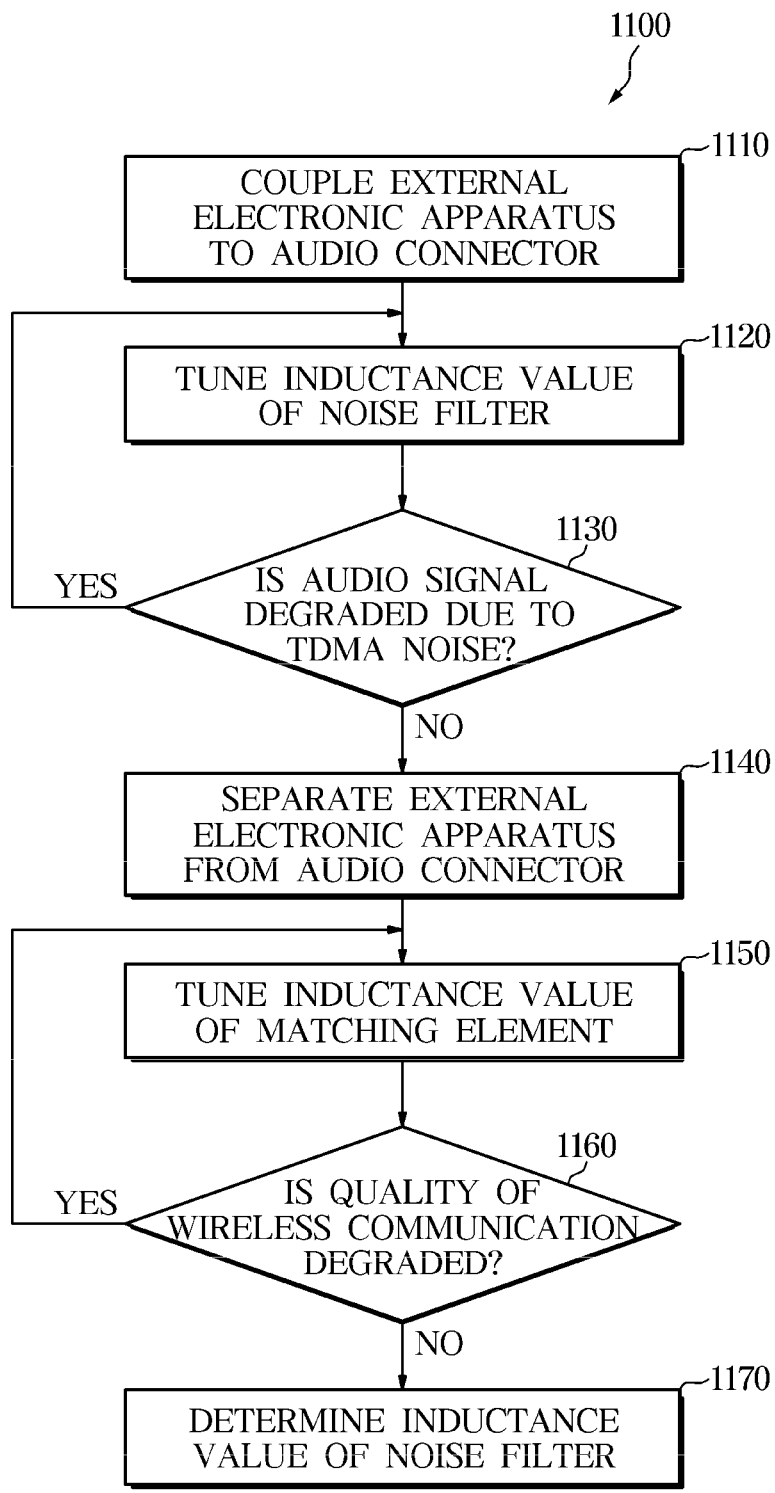
FIG. 12 illustrates a method of improving audio quality and communication quality using a noise filter and a matching element of the audio input/output interface illustrated in FIG. 8 according to an embodiment of the disclosure.

FIG. 12 illustrates a method of improving audio quality and communication quality using a noise filter and a matching element of an audio input/output interface illustrated in FIG. 8 according to an embodiment of the disclosure.

Referring to FIG. 12, in the method 1100 the external electronic apparatus 102 may be coupled to the audio connector 178a of the electronic apparatus 101 at operation 1110.

An inductance value of the noise filter 355 included in the electronic apparatus 101 may be tuned at operation 1120.

It may be identified whether an audio signal input through the microphone terminal MIC is degraded due to communication noise (e.g., TDMA noise) at operation 1130.

A description of operation 1130 may be replaced by the description of operation 1030 illustrated in FIG. 7.

When it is identified that the audio signal is degraded due to the communication noise (YES at operation 1130), the inductance value of the noise filter 355 included in the electronic apparatus 101 may be tuned at operation 1120.

When the audio signal degradation due to the communication noise is not identified (NO at operation 1130), the external electronic apparatus 102 may be separated from the audio connector 178a of the electronic apparatus 101 at operation 1140.

The inductance value of the matching element 357 included in the electronic apparatus 101 may be tuned at operation 1150.

It may be identified whether the quality of the wireless communication through the antenna 400 is reduced at operation 1160.

A description of operation 1160 may be replaced by the description of operation 1050 illustrated in FIG. 7.

Once the quality reduction of the wireless communication is identified (YES at operation 1060), the inductance value of the matching element 357 included in the electronic apparatus 101 may be tuned at operation 1170.

According to various embodiments of the disclosure, an inductance (or capacitance) of the noise filter 355 is determined to be a value which satisfies the condition of the audio quality, and an inductance (or capacitance) of the matching element 357 may be determined to be a value to satisfy the condition of the wireless communication quality. Thus, the best audio quality and the best wireless communication quality may be provided because the inductance (or capacitance) value of the noise filter 355 and the inductance (or capacitance) value of the matching element 357 may be set independently.

Figure 13:
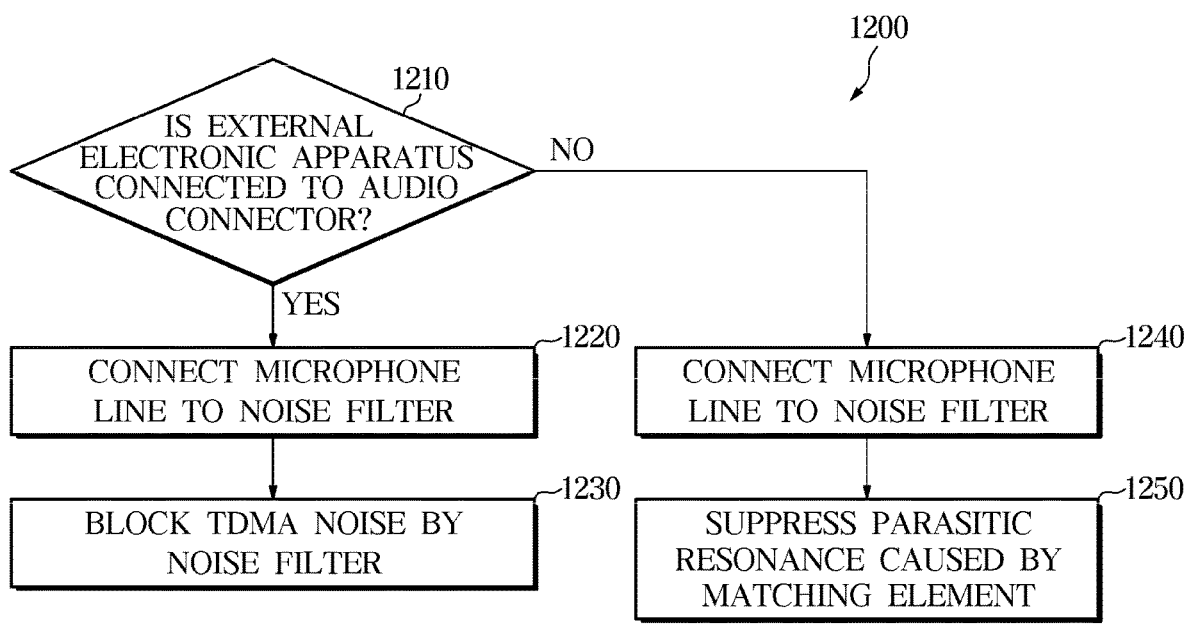
FIG. 13 illustrates an operation of the electronic apparatus that includes the audio input/output interface shown in FIG. 8 according to an embodiment of the disclosure.

FIG. 13 illustrates an operation of an electronic apparatus that includes an audio input/output interface shown in FIG. 8 according to an embodiment of the disclosure.

According to one embodiment, in the operation 1200 the electronic apparatus 101 may identify whether the external electronic apparatus 102 is connected to the audio connector 178a at operation 1210.

According to one embodiment, the connection terminal 178 of the electronic apparatus 101 may output a detection signal on the basis of whether the external electronic apparatus 102 is coupled to the connection terminal 178. According to one embodiment, the detection signal of the connection terminal 178 may be transmitted to the audio signal processor 240 through the detection signal line 340.

When it is identified that the external electronic apparatus 102 is connected to the audio connector 178a (YES at operation 1210), the electronic apparatus 101 may connect the microphone line 350, to which an audio signal is transmitted, to the noise filter 355 at operation 1220.

According to one embodiment, the connection terminal 178 of the electronic apparatus 101 may output a detection signal of a logic value "1" (or HIGH) on the basis that the external electronic apparatus 102 is inserted into the audio connector 178a.

According to one embodiment, the switch 353 of the electronic apparatus 101 may electrically connect the common terminal Com connected to the microphone line 350 to the first output terminal Out1 connected to the noise filter 355 in response to the detection signal of the logic value "1" (or HIGH). Accordingly, an audio signal received through the microphone terminal MIC may be transmitted to the audio signal processor 240 via the noise filter 355.

Communication noise (e.g., TDMA noise) may be blocked or suppressed by the noise filter 355 while the audio signal passes through the noise filter 355 at operation 1230.

According to one embodiment, the communication noise may be introduced from the antenna line 410 disposed near the microphone line 350 while the audio signal is transmitted through the microphone line 350.

According to one embodiment, the noise filter 355 may include an inductive element and/or a capacitive element to block or suppress communication noise introduced from the antenna 400. According to one embodiment, the noise filter 355 may include a bead or an inductor or may include a capacitor or an electrolytic capacitor.

The communication noise mixed with the audio signal may be blocked or suppressed by the noise filter 355.

When it is identified that the external electronic apparatus 102 is not connected to the audio connector 178a (NO at operation 1210), the electronic apparatus 101 may connect the microphone line 350 and the matching element 357 at operation 1240.

According to one embodiment, the connection terminal 178 of the electronic apparatus 101 may output a detection signal of a logic value "0" (or LOW) on the basis that the external electronic apparatus 102 is separated from the audio connector 178a.

According to one embodiment, the switch 353 of the electronic apparatus 101 may electrically connect the common terminal Com connected to the microphone line 350 and the second output terminal Out2 connected to the matching element 357 in response to the detection signal of the logic value "0" (or LOW). Accordingly, the microphone line 350 and the matching element 357 may integrally form a resonant circuit.

Parasitic resonance, which may occur while the external electronic apparatus 102 is separated from the audio connector 178a, in a frequency band adjacent to an operating frequency band or operating frequency of the antenna 400 may be suppressed by the matching element 357 at operation 1250.

According to one embodiment, the microphone line 350 may cause parasitic resonance together with the noise filter 355, and a resonant frequency of the parasitic resonance caused by the microphone line 350 and the noise filter 355 may be in the operating frequency band of the antenna 400.

According to one embodiment, by the switch 353, the microphone line 350 may be disconnected from the noise filter 355 and may be electrically connected to the matching element 357. At this point, the microphone line 350 may cause parasitic resonance together with the matching element 357. However, a resonant frequency of the parasitic resonance caused by the microphone line 350 and the matching element 357 may deviate from the operating frequency band of the antenna 400 or a frequency band adjacent to the operating frequency. Thus, performance degradation of the antenna 400 by parasitic resonance, which may occur while the external electronic apparatus 102 is separated from the audio connector 178a, may be suppressed or reduced.

Figure 14:
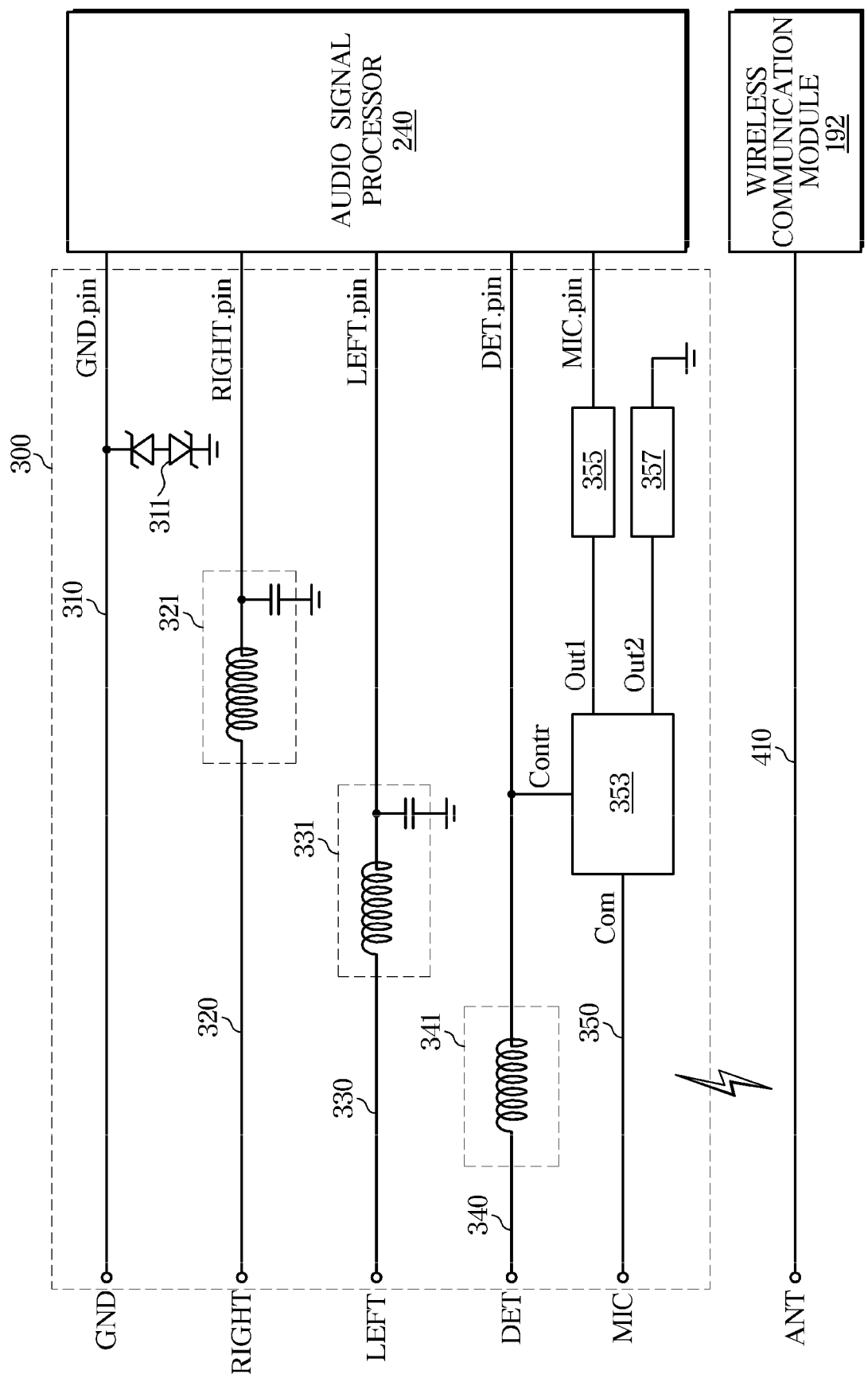
FIG. 14 illustrates an example of the audio input/output interface according to an embodiment of the disclosure.

FIG. 14 illustrates an example of an audio input/output interface according to an embodiment of the disclosure.

Referring to FIG. 14, the audio input/output interfaces 210 and 270 may include a plurality of signal lines 300.

According to one embodiment, the plurality of signal lines 300 may include a ground line 310, a right signal line 320, a left signal line 330, a detection signal line 340, or a microphone line 350. Descriptions of the ground line 310, the right signal line 320, the left signal line 330, and the detection signal line 340 may be replaced by the descriptions of the ground line, the right signal line, the left signal line, and the detection signal line illustrated in FIG. 3.

According to one embodiment, a switch 353 may be disposed on the microphone line 350, and the switch 353 may be electrically connected to a noise filter 355 or a matching element 357.

According to one embodiment, the switch 353 may include a common terminal Com, a first output terminal Out1, or a second output terminal Out2 through which a signal is input and/or output. According to one embodiment, the common terminal Com may be electrically connected to the microphone terminal MIC of the audio connector 178a, the first output terminal Out1 may be electrically connected to the noise filter 355, and the second output terminal Out2 may be electrically connected to the matching element 357.

Structures and operations of the switch 353 and the noise filter 355 are the same as those of the switch and the noise filter illustrated in FIG. 8, and descriptions of the switch 353 and the noise filter 355 may be replaced by the descriptions of the switch and the noise filter shown in FIG. 8.

According to one embodiment, the matching element 357 may include an inductive element and may adjust a resonant frequency of parasitic resonance caused by the microphone line 350.

According to one embodiment, one end of the matching element 357 may be connected to the second output terminal Out2 of the switch 353, and the other end of the matching element 357 may be connected to the ground (e.g., the ground included in the electronic apparatus 101).

According to one embodiment, since the other end of the matching element 357 is connected to the ground, a resonant frequency of parasitic resonance caused by the matching element 357 and the microphone line 350 may be stabilized. Accordingly, a variation of the resonant frequency of the parasitic resonance caused by the microphone line 350 and the matching element 357 may be prevented or suppressed.

According to various embodiments of the disclosure, since the other end of the matching element 357 may be connected to the ground, the variation of the resonant frequency of the parasitic resonance may be prevented or suppressed. As another example, unintentional degradation in the performance of the antenna 400, which may occur due to the variation in the resonant frequency, may be prevented or suppressed.

Figure 15:
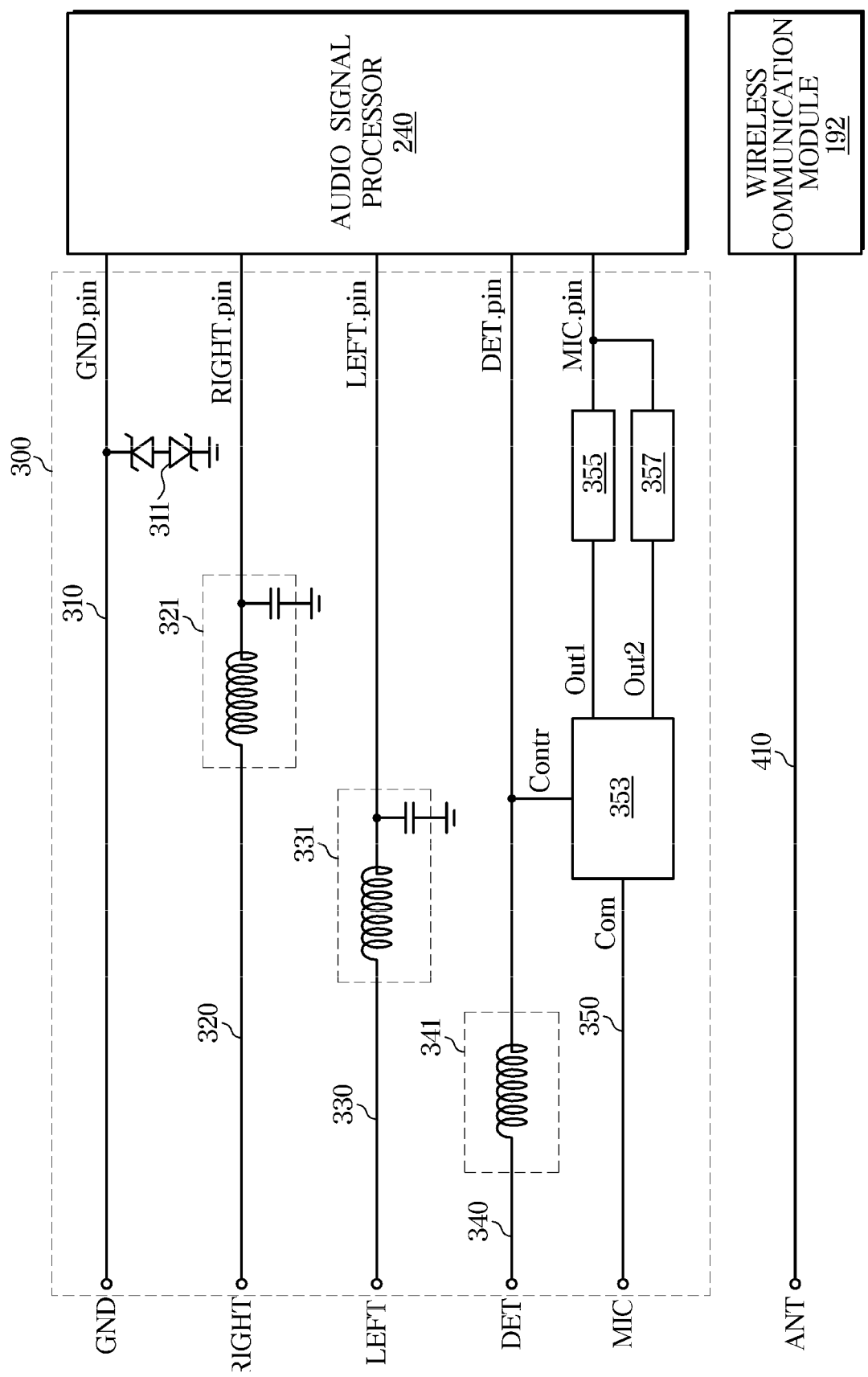
FIG. 15 illustrates an example of the audio input/output interface according to an embodiment of the disclosure.

FIG. 15 illustrates an example of an audio input/output interface according to an embodiment of the disclosure.

Referring to FIG. 15, the audio input/output interfaces 210 and 270 may include a plurality of signal lines 300.

According to one embodiment, the plurality of signal lines 300 may include a ground line 310, a right signal line 320, a left signal line 330, a detection signal line 340, or a microphone line 350. Descriptions of the ground line 310, the right signal line 320, the left signal line 330, and the detection signal line 340 may be replaced by the descriptions of the ground line, the right signal line, the left signal line, and the detection signal line illustrated in FIG. 3.

According to one embodiment, a switch 353 may be disposed on the microphone line 350, and the switch 353 may be electrically connected to a noise filter 355 or a matching element 357.

According to one embodiment, the switch 353 may include a common terminal Com, a first output terminal Out1, or a second output terminal Out2 through which a signal is input and/or output. According to one embodiment, the common terminal Com may be electrically connected to the microphone terminal MIC of the audio connector 178a, the first output terminal Out1 may be electrically connected to the noise filter 355, and the second output terminal Out2 may be electrically connected to the matching element 357. According to one embodiment, a structure and operation of the switch 353 are substantially the same as those of the switch illustrated in FIG. 8, and a description of the switch 353 may be replaced by the description of the switch illustrated in FIG. 8.

Structures and operations of the switch 353 and the noise filter 355 are substantially the same as those of the switch and the noise filter illustrated in FIG. 8, and descriptions of the switch 353 and the noise filter 355 may be replaced by the descriptions of the switch and the noise filter shown in FIG. 8.

According to one embodiment, the matching element 357 may include an inductive element and may adjust a resonant frequency of parasitic resonance caused by the microphone line 350.

According to one embodiment, one end of the matching element 357 may be connected to the second output terminal Out2 of the switch 353, and the other end of the matching element 357 may be connected to the microphone pin MIC.pin of the audio signal processor 240.

Since the other end of the matching element 357 is connected to the audio signal processor 240, a resonant frequency of parasitic resonance caused by the matching element 357 and the microphone line 350 may be stabilized.

According to various embodiments of the disclosure, since the other end of the matching element 357 may be connected to the audio signal processor 240, a variation of the resonant frequency of the parasitic resonance may be prevented or suppressed. As another example, unintentional degradation in the performance of the antenna 400, which may occur due to the variation in the resonant frequency, may be prevented or suppressed.

According to one embodiment, an electronic apparatus may include a housing having a first surface, an antenna configured to transmit and/or receive a wireless signal through at least a part of the first surface, an interface that is connectable to an external terminal of an external apparatus via an audio connector formed on the first surface and configured to provide a detection signal indicating whether a connection with the external terminal is made, a processor configured to process an audio signal received from the external terminal of the external apparatus via the interface, a signal line extending from the interface, a noise filter connected to the processor, a matching element, and a switch configured to electrically connect one of the noise filter and the matching element to the signal line based on the detection signal.

Accordingly, the electronic apparatus may prevent or suppress noise in an audible frequency band, and also prevent or suppress performance degradation of the antenna caused by the audio signal line.

According to one embodiment, the switch may include a control terminal configured to receive the detection signal, a common terminal connected to the signal line, a first output terminal connected to the noise filter, and a second output terminal connected to the matching element. The switch may connect the common terminal to the first output terminal or connect the common terminal to the second output terminal based on the detection signal input through the control terminal. The switch may connect the common terminal to the first output terminal in response to a detection signal indicating a connection with the external terminal. In addition, the switch may connect the common terminal to the second output terminal in response to a detection signal indicating separation of the external terminal.

Accordingly, the electronic apparatus may selectively perform either blocking of noise in an audible frequency band or preventing performance degradation of the antenna by using a switch having a simple structure.

According to one embodiment, the noise filter may include at least one of an inductive element and a capacitive element for blocking noise introduced from the antenna. For example, an inductance of the inductive element may be a value between 30 nH and 50 nH.

Accordingly, communication noise being mixed with an audio signal while receiving the audio signal from an external device (e.g., an earphone or headset) may be blocked or suppressed.

According to one embodiment, the matching element may adjust a resonant frequency of resonance caused by the signal line such that the resonant frequency of the resonance caused by the signal line deviates from the operating frequency band of the antenna. The matching element may include at least one of an inductive element and a capacitive element for adjusting the resonant frequency of the resonance caused by the signal line. For example, an inductance of the inductive element may be a value between 20 nH and 30 nH.

Accordingly, while the external apparatus is separated from the audio connector, the resonant frequency of the resonance in the signal line may deviate from an operating frequency band of the antenna and performance degradation of the antenna due to the resonance caused by the signal line may be prevented or suppressed.

According to one embodiment, the matching element may be connected to the ground of the electronic apparatus or connected to the processor.

Accordingly, a resonant frequency caused by the matching element may be prevented or suppressed from becoming unstable due to voltage instability of the matching element.

According to various embodiments of the disclosure, it is possible to provide an electronic apparatus in which noise in an audible frequency band can be blocked or suppressed and performance degradation of an antenna caused by an audio signal line can be prevented or suppressed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a housing comprising a first surface;
an antenna configured to transmit and receive a wireless signal using at least a part of the first surface;
a connection terminal formed on the first surface,
wherein the connection terminal is configured to be connectable to an external apparatus for receiving an audio signal from an external device and provide a detection signal indicating whether a connection with the external apparatus is made;

an audio signal processor configured to process the audio signal; and an audio input/output interface configured to connect the connection terminal and the audio signal processor, wherein the audio input/output interface comprises:
- a detection signal line configured to transmit the detection signal from the connection terminal to the audio signal processor,
- a microphone line configured to transmit the audio signal from the connection terminal to the audio signal processor,
- a noise filter configured to reduce a noise mixed with the audio signal while the connection terminal is connected to the external device and receives the audio signal,
- a matching element configure to adjust a resonant frequency of resonance that occurs while the connection terminal is separated from the external device, and
- a switch configured to electrically connect at least one of the noise filter or the matching element to the microphone line, based on the detection signal received from the detection signal line.

2. The electronic apparatus of claim 1, wherein the switch includes:
- a control terminal configured to receive the detection signal from the detection signal line,
- a common terminal connected to the microphone line,
- a first output terminal connected to the noise filter, and
- a second output terminal connected to the matching element, and wherein the switch connects the common terminal to the first output terminal or to the second output terminal, based on the detection signal.

3. The electronic apparatus of claim 2, wherein the switch connects the common terminal to the first output terminal in response to the detection signal indicating that the connection terminal is connected to the external device.

4. The electronic apparatus of claim 2, wherein the switch connects the common terminal to the second output terminal in response to a detection signal indicating that the connection terminal is separated from the external device.

5. The electronic apparatus of claim 1, wherein the noise filter includes at least one of an inductive element or a capacitive element, which blocks the noise mixed with the audio signal.

6. The electronic apparatus of claim 5, wherein an inductance of the inductive element is a value between 30 nano-Henry (nH) and 50 nH.

7. The electronic apparatus of claim 1, wherein the matching element adjusts the resonant frequency of resonance so that the resonant frequency of the resonance deviates from an operating frequency band of the antenna.

8. The electronic apparatus of claim 1, wherein the matching element includes at least one of an inductive element or a capacitive element which adjusts the resonant frequency of resonance.

9. The electronic apparatus of claim 8, wherein an inductance of the inductive element is a value between 20 nano-Henry (nH) and 30 nH.

10. The electronic apparatus of claim 1, wherein the matching element is connected to a ground of the electronic apparatus.

11. The electronic apparatus of claim 1, wherein the matching element is connected to the audio signal processor.

* * * * *